United States Patent
Sato

(10) Patent No.: US 7,860,954 B2
(45) Date of Patent: Dec. 28, 2010

(54) DEVICE MANAGEMENT SYSTEM AND CONTROL METHOD THEREFOR

(75) Inventor: Tomoya Sato, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 681 days.

(21) Appl. No.: 11/681,885

(22) Filed: Mar. 5, 2007

(65) Prior Publication Data
US 2007/0226725 A1    Sep. 27, 2007

(30) Foreign Application Priority Data

Mar. 7, 2006    (JP)    ............... 2006-061737

(51) Int. Cl.
*G06F 15/177*    (2006.01)
(52) U.S. Cl. ............ 709/220; 709/230; 709/218; 725/39; 379/265
(58) Field of Classification Search ......... 709/223, 709/220, 206; 725/39; 379/265
See application file for complete search history.

(56) References Cited

U.S. PATENT DOCUMENTS

| 2002/0042916 | A1* | 4/2002 | Mineyama | ............... 725/39 |
| 2002/0143936 | A1 | 10/2002 | Yu | |
| 2005/0132048 | A1 | 6/2005 | Kogan et al. | |
| 2005/0198021 | A1 | 9/2005 | Wilcox | |
| 2006/0245579 | A1* | 11/2006 | Bienfait et al. | ............... 379/265.02 |
| 2008/0256207 | A1* | 10/2008 | Doi | ............... 709/206 |
| 2009/0106393 | A1* | 4/2009 | Parr et al. | ............... 709/218 |

FOREIGN PATENT DOCUMENTS

JP    2002-288056    10/2002

* cited by examiner

*Primary Examiner*—Tammy T Nguyen
(74) *Attorney, Agent, or Firm*—Cowan, Liebowitz & Latman, P.C.

(57) ABSTRACT

A device management apparatus is equipped with a function to record document information including link information about a specified linked object in response to a link request and a Web server function to provide the document information to a Web client and is connected with a managed device. The device management apparatus has a recording unit which records information about the managed device; a Web server unit which provides the information to the Web client; and a transmission unit which transmits, to the managed device, a link request for the information about the managed device recorded by the recording unit.

8 Claims, 20 Drawing Sheets

FIG. 14

```
POST http://device.example.com/log/trackback      1401
Content-Type: application/x-www-form-urlencoded   1402 title = CHANGES MADE BY THE MANAGEMENT UTILITY    1403
&url = http://management_server.example.com/pageid1   1404
&excerpt = SETTING CHANGES HAVE BEEN MADE BY THE MANAGEMENT UTILITY. FOR DETAILS, FOLLOW THE LINK.   1405
```

DEVICE MANAGEMENT SYSTEM AND CONTROL METHOD THEREFOR

BACKGROUND OF THE INVENTION

1. Field of the Invention

The present invention relates to a system which includes a management apparatus and devices managed by the management apparatus.

2. Description of the Related Art

Many information devices are designed to be connected to networks and used for various applications. Among other things, the WWW (World Wide Web: also referred to simply as the Web) has spread remarkably. Various image processing devices and management apparatuses which manage them are equipped with Web server functions and have come to be equipped with Web application functions which allow users to view various information and make settings using a Web browser. Some of the apparatuses equipped with such Web applications have enhanced convenience by establishing links from a Web page of a management apparatus to Web pages of apparatuses under management and vice versa.

When such an apparatus detects that a device has been connected to a network, it determines whether the detected device can generate links. A management apparatus has been proposed which transmits, to a device, link information for use to link to the management apparatus when it is found that the device can generate links (e.g., Japanese Patent Application Publication No. 2002-288056). Also, Japanese Patent Application Publication No. 2002-288056 proposes an apparatus under management which generates a link to the management apparatus upon receiving link information.

In this way, by establishing links mutually between Web applications of a management apparatus and an apparatus under its management, it is possible to provide a highly convenient system to the user.

However, only a link to a particular page (top page of the Web application of the remote party) is provided to each party, and it is not possible to generate a link dynamically to any page. Thus, even if the link is traced from a Web page of an apparatus under management to the Web page of the management apparatus, it is necessary to search for a desired page.

SUMMARY OF THE INVENTION

The present invention has been made in view of the conventional example and has an object to solve the above problem. More particularly, an object of the present invention is to provide a management program which records information about any setting change of a device under management made by a management apparatus in the management apparatus and registers a link to the information with the apparatus under management.

Another object of the present invention is to provide a management program which records information about any setting change of a device under management made by a client in the apparatus under management and registers a link to the information with the management apparatus.

To solve the above problem, the present invention is configured as follows. Specifically, the present invention provides a device management apparatus which, being connected with a managed device, has a function to record document information including link information about a specified linked object in response to a link request and a Web server function to provide the document information to a Web client, comprising:

a recording unit, adapted to record information about the managed device;

a Web server unit, adapted to provide the information to the Web client; and a transmission unit, adapted to transmits, to the managed device, a link request for the information about the managed device recorded by the recording unit.

With the above configuration, the link information registered with the device under management makes it possible to easily access information about setting changes of the device under management recorded in the management apparatus, allowing the user to view the setting change information easily. Also, by recording detailed information in the management apparatus, it is possible to provide ample information without imposing a storage burden on the device under management.

Also, the link information registered with the management apparatus allows the management apparatus to easily access information about setting changes of the device under management recorded in the device under management, allowing the user to view the setting change information easily.

Further features of the present invention will become apparent from the following description of exemplary embodiments with reference to the attached drawings.

BRIEF DESCRIPTION OF THE DRAWINGS

FIG. 14 is a diagram showing an example of a link request;

DESCRIPTION OF THE EMBODIMENTS

System Configuration

Figure 1:
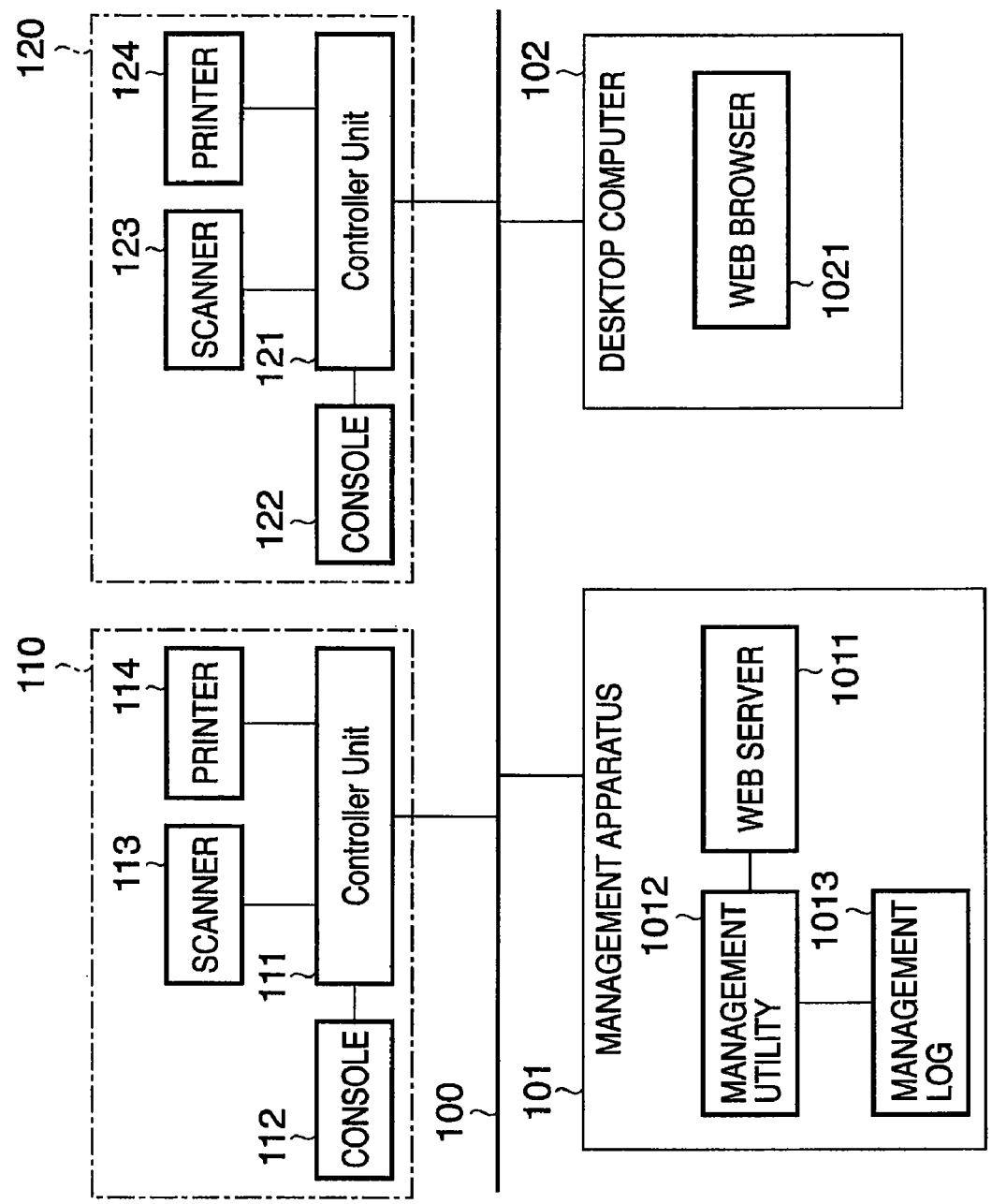
FIG. 1 is a block diagram showing an overall configuration of an image processing system according to an embodiment of the present invention.

The best mode for carrying out the present invention will be described below with reference to the drawings. FIG. 1 is a block diagram showing an overall configuration of an image processing system according to an embodiment of the present invention. In FIG. 1, the image processing system consists of an image processing apparatus (apparatus under management) 110 and 120, management apparatus 101, and desktop computer 102 connected with each other via a network 100. The network 100 may be of any type as long as it is compatible with TCP/IP.

The image processing apparatus 110 and 120 have the same configuration, and thus only the image processing apparatus 110 will be described here. The image processing apparatus 110 consists of a scanner 113 which is an image input device, printer 114 which is an image output device, controller unit 111, and console 112 which is a user interface.

The scanner 113, printer 114, and console 112 are connected to the controller unit 111 and are controlled by instructions from the controller unit 111. The controller unit 111 is connected to the network 100 and communicates with the management apparatus 101 and desktop computer 102.

The management apparatus 101 communicates with the image processing apparatus 110 and 120 via the network 100. It acquires various set values from the image processing apparatus 110 and 120, and manages their settings and the like. The management apparatus 101 is a general-purpose computer. It is equipped with interface devices such as a keyboard and display as well as with a processor, memory, and external storage. The management apparatus 101 performs its functions by running a Web server 1011 and a management utility 1012 which is a software module installed on the Web server 1011. The management utility 1012 is implemented, for example, as a so-called CGI program which executes scripts described in Web pages provided by the Web server and implements a Web application for management of the image processing apparatus in conjunction with the Web server 1011. Also, the management utility 1012 records setting changes of the image processing apparatus 110 in a management log 1013. The Web server 1011 allows the record of the setting changes to be viewed from a Web browser 1021 executed by the desktop computer 102 via the network 100. That is, link information can be described in the management log 1013, which is written in a mark-up language such as HTML or XML.

The desktop computer 102 is an information processing apparatus used commonly by a user. It has a configuration of a general-purpose computer. It stores application programs used by the user, user's data, and the like. The application programs used by the user include the Web browser 1021. The Web browser 1021 running on the desktop computer 102 makes it possible to view and operate Web applications provided by the image processing apparatus 110 and 120 or the management apparatus 101.

Incidentally, although only two image processing apparatus are connected to the network 100 in the above example, more than two devices may be connected. Also, the device managed by the management apparatus may be a printer or the like without a scanner 113. The management apparatus 101 manages these devices.

<Software Configuration of Image Processing Apparatus>

Figure 2:
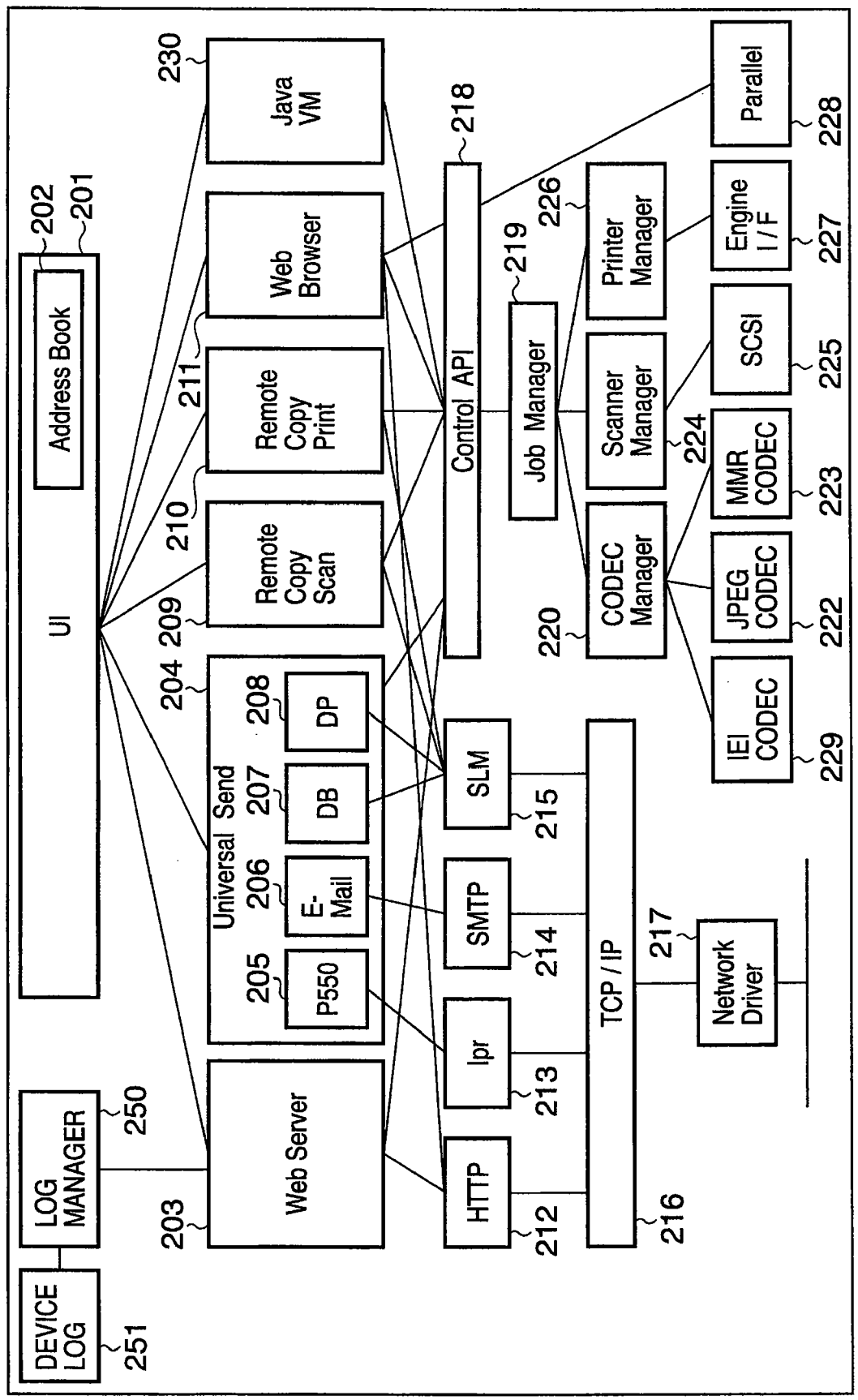
FIG. 2 is a block diagram showing a configuration of software executed on an image processing apparatus.

FIG. 2 is a block diagram showing a configuration of software executed on the image processing apparatus 110 and 120. A User-Interface (UI) module 201 mediates between apparatus and user operation when the operator performs various actions or makes various settings with respect to the image processing apparatus. It makes processing requests or data settings in response to an operator action by transferring input data to various modules (described later).

An Address-Book module 202 is a database module which manages delivery destinations, communication addresses, and the like of data. Data is added, deleted, or acquired to/from the data managed by the Address-Book module 202 based on instructions from the UI module 201. Also, the Address-Book module 202 provides delivery destination/communication address information of data to various modules (described later) in response to an operator action.

A Web-Server module 203 provides management information about the image processing apparatus to a Web client (e.g., the desktop computer 102) in response to a request from the Web client. The management information is acquired via a Universal-Send module 204, Remote-Copy-Scan module 209, Remote-Copy-Print module 210, and Control-API module 218 (described later). It is provided to the Web client via an HTTP module 212, TCP/IP-Communications module 216, and Network-Driver module 217 (described later).

The Universal-Send module 204 manages distribution of data. It distributes data specified by the operator via the UI module 201 to a communication address (output destination) specified in a similar manner. Also, when the operator specifies the given image processing apparatus to generate distribution data using its scanner function, the Universal-Send module 204 makes the given image processing apparatus generate the data, via the Control-API module 218 (described later).

A P550 module 205 is included in the Universal-Send module 204 and is executed when a printer is specified as an output destination. An E-Mail module 206 is included in the Universal-Send module 204 and is executed when an e-mail address is specified as a communication address. A DB module 207 is included in the Universal-Send module 204 and is executed when a database is specified as an output destination. A DP module 208 is included in the Universal-Send module 204 and is executed when an image processing apparatus similar to the given image processing apparatus is specified as an output destination.

The Remote-Copy-Scan module 209 reads image information using the scanner function of the image processing apparatus and outputs it to another image processing apparatus connected via a network or the like. In this way, it implements a copy function, originally implemented by a single apparatus, using a plurality of image processing apparatus.

The Remote-Copy-Print module 210 outputs image information obtained by another image processing apparatus connected via a network or the like, using a printer function of the given image processing apparatus. In this way, it implements a copy function, originally implemented by a single apparatus, using a plurality of image processing apparatus.

A Web Browser module 211 displays information read from various Web sites (home pages) on the Internet or intranets. It also provides a Web pull print function to print out information acquired from Web sites.

The HTTP module 212 is used when the image processing apparatus 110 conducts communications using HTTP (Hyper Text Transfer Protocol). The HTTP module 212 provides communication functions to the Web-Server module 203 and Web Browser module 211 using the TCP/IP-Communications module 216. The HTTP module 212 supports various protocols used on the Web including HTTP. In particular, it provides communication functions using security protocols.

An lpr module 213 provides communication functions to the P550 module 205 in the Universal-Send module 204 using the TCP/IP-Communications module 216 (described later).

An SMTP module 214 provides communication functions to the E-Mail module 206 in the Universal-Send module 204 using the TCP/IP-Communications module 216.

An SLM (Salutation-Manager) module 215 provides communication functions to the DB module 207, DP module 208, Remote-Copy-Scan module 209, and Remote-Copy-Print module 210 in the Universal-Send module 204 using the TCP/IP-Communications module 216.

The TCP/IP-Communications module 216 provides network communication functions to the above-described modules using the Network-Driver module 217. The Network-Driver module 217 controls part which is physically connected to the network.

The Control-API module 218 provides upstream modules such as the Universal-Send module 204 with interfaces to downstream modules such as a Job-Manager module 219. This reduces interdependence between the upstream and downstream modules and increases their compatibility.

The Job-Manager module 219 interprets various processes specified by the above-described modules via the Control-API module 218 and gives instructions to modules (220, 224, and 226) described below. Also, the Job-Manager module 219 collectively manages hardware-based processes executed in the image processing apparatus.

The CODEC-Manager module 220 manages/controls various types of data compression/decompression in the processes specified by the Job-Manager module 219.

A JPEG-CODEC module 222 JPEG-compresses data read in scanning processes performed by the Job-Manager module 219 or Scan-Manager module 224 and JPEG-decompresses print data in printing processes performed by the Print-Manager module 226.

An MMR-CODEC module 223 MMR-compresses data read in scanning processes performed by the Job-Manager module 219 or Scan-Manager module 224 and MMR-decompresses print data in printing processes performed by the Print-Manager module 226.

An Information-Embedded-Image-CODEC (IEI-CODEC) module 229 decodes information embedded in image data read in scanning processes and embeds information in printed image data in printing processes. The scanning processes are performed by the Job-Manager module 219 or Scan-Manager module 224 while the printing processes are performed by the Print-Manager module 226. The embedding of information into image data is done using a barcode, digital watermark, or other coding technique. Also, character recognition which involves recognizing characters in images in image data by image area separation and OCR and converting the recognized characters into text data is supported as a kind of decoding technique. Furthermore, a technique which involves converting text data into image data using a raster image processor and overlaying the resulting image data and original image data is also supported as a kind of coding technique (information embedding technique).

The Scan-Manager module 224 manages/controls scanning processes specified by the Job-Manager module 219.

An SCSI driver 225 mediates communications between the Scan-Manager module 224 and a scanner unit internally connected to the image processing apparatus.

The Print-Manager module 226 manages/controls printing processes specified by the Job-Manager module 219.

An Engine-I/F module 227 provides an interface between the Print-Manager module 226 and a printer unit.

A parallel port driver 228 provides an interface used to output data to output devices (not shown) via a parallel port.

A JAVA (registered trademark) virtual machine 230 includes an interpreter used to operate JAVA (registered trademark) programs on the image processing apparatus. The JAVA (registered trademark) VM 230 manages and executes additional applications which are written as JAVA (registered trademark) programs and can be added/deleted dynamically.

A log manager 250 is a program which runs, being embedded in the Web server 203. It manages device log information 251. The device log information 251 consists of link information received together with link requests from the management apparatus 101 and accumulated additionally in an HTML file of a remote UI (described later). According to this embodiment, a commercially available Web log system (e.g., Movable Type from Six Apart Ltd.) may be used as the log manager 250. In FIG. 2, the device log information is shown as being separate from the HTML file provided to the network by the Web server 203, but of course it may be stored in the same storage location as the HTML file.

<Hardware Configuration of Image Processing Apparatus>

Figure 3:
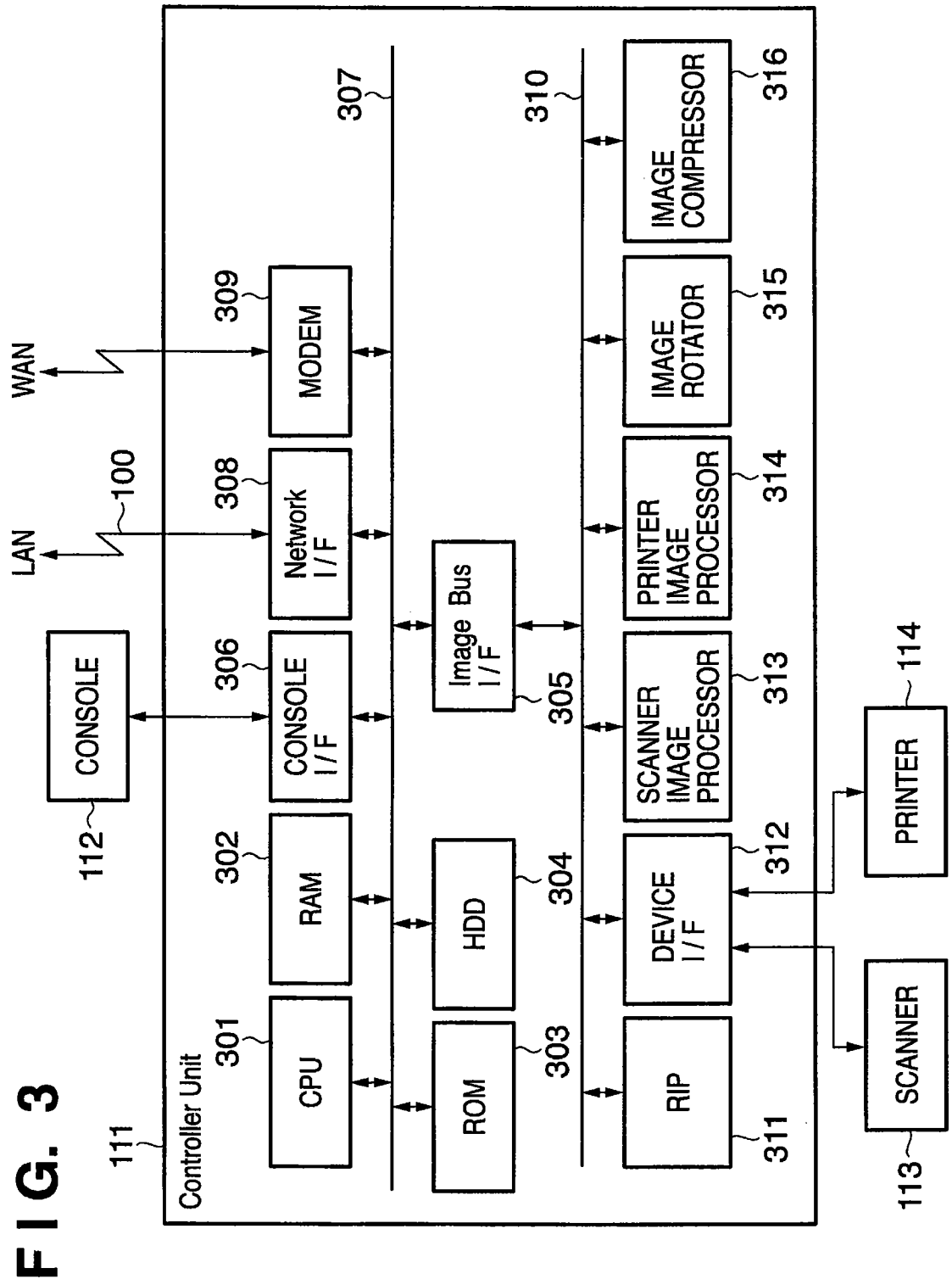
FIG. 3 is a block diagram showing a hardware configuration of the image processing apparatus.

FIG. 3 is a block diagram showing a hardware configuration of the image processing apparatus 110. The controller unit 111 handles input, output, and the like of image information and device information by connecting with the scanner 113 which is an image input device and the printer 114 which is an image output device on one hand while connecting to the LAN 100 or a public circuit (WAN) on the other hand.

A CPU 301 is a controller which controls the entire controller unit 111. A RAM 302 is a system work memory used by the CPU 301 for its operation. The RAM 302 also serves as an image memory for use to temporarily store image data. A ROM 303 is a boot ROM which stores a system boot program. An HDD 304 is a hard disk drive which stores system software and image data.

A console I/F 306 interfaces with the console (UI) 112 and outputs image data to the console 112 in order for the image data to be displayed thereon. Also, it serves to convey information entered by the user via the console 112 to the CPU 301.

A network I/F 308 manages connection with the LAN 100 and inputs and outputs information to/from the LAN 100. A modem 309 manages connection with a public circuit and inputs and outputs information to/from the public circuit. The devices described above are placed on a system bus 307.

An image bus I/F 305 is a bus bridge which connects the system bus 307 with an image bus 310 and converts data structure, where the image bus 310 transfers image data at high speed. The image bus 310 is based on PCI or IEEE 1394. Devices described below are placed on the image bus 310.

A raster image processor 311 converts PDL code transmitted from the network into a bitmap image. A device I/F 312 perform synchronous/asynchronous conversion of image data by connecting the scanner 113 and printer 114 which are input/output devices to the controller unit 111.

A scanner image processor 313 corrects, manipulates, and edits input image data. A printer image processor 314 performs correction, resolution conversion, and the like with respect to image data to be printed out according to performance of the printer 114. An image rotator 315 rotates image data. An image compressor 316 performs JPEG compression/decompression of multi-valued image data as well as JBIG, MMR, MH and other compression/decompression of binary image data.

Figure 4:
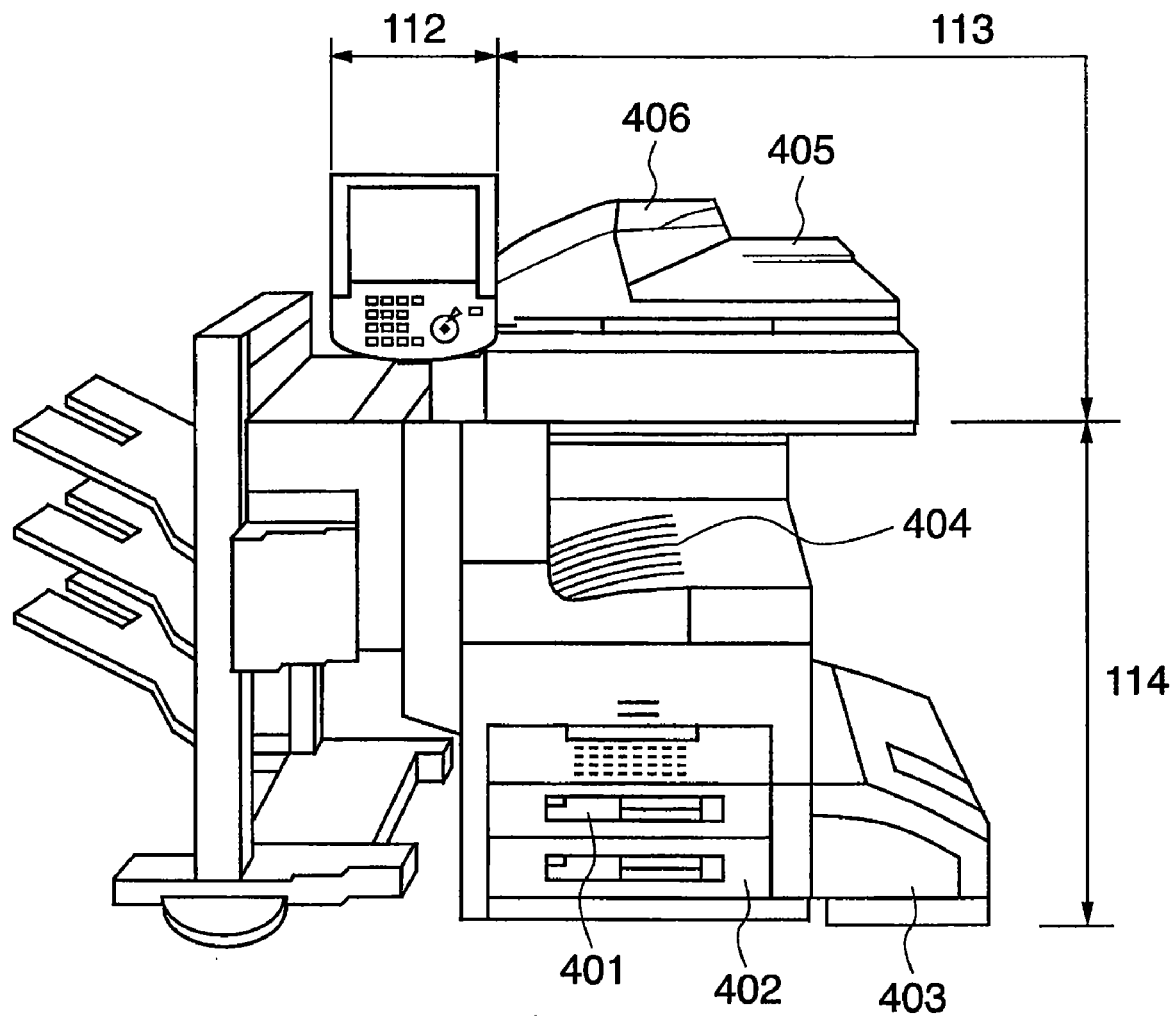
FIG. 4 is a perspective view showing external appearance of the image processing apparatus.

FIG. 4 is a perspective view showing the external appearance of the image processing apparatus 110. The scanner 113 which is an image input device illuminates an image in an original, scans it with a CCD line sensor (not shown), and thereby generates raster image data.

When the user sets a source document on a tray 406 of a document feeder 405 and gives a start-reading command via the console 112, the CPU 301 of the controller unit 111 gives an instruction to the scanner 113. In response to the instruction, the source document on the tray 406 is fed sheet by sheet and the scanner 113 reads original images.

The printer 114 which is an image output device prints raster image data on paper. Available printing methods include electrophotographic printing which employs a photosensitive drum or photosensitive belt and inkjet printing which involves printing image directly on paper by discharging ink from a micro nozzle array, and any of them may be used. Incidentally, printing operation is started upon instructions from the CPU 301.

The printer 114 has a plurality of paper feed units to allow selection from different paper sizes or different paper orientations and has corresponding paper cassettes 401, 402, and 403. A paper output tray 404 receives paper which has gone through printing.

Figure 5:
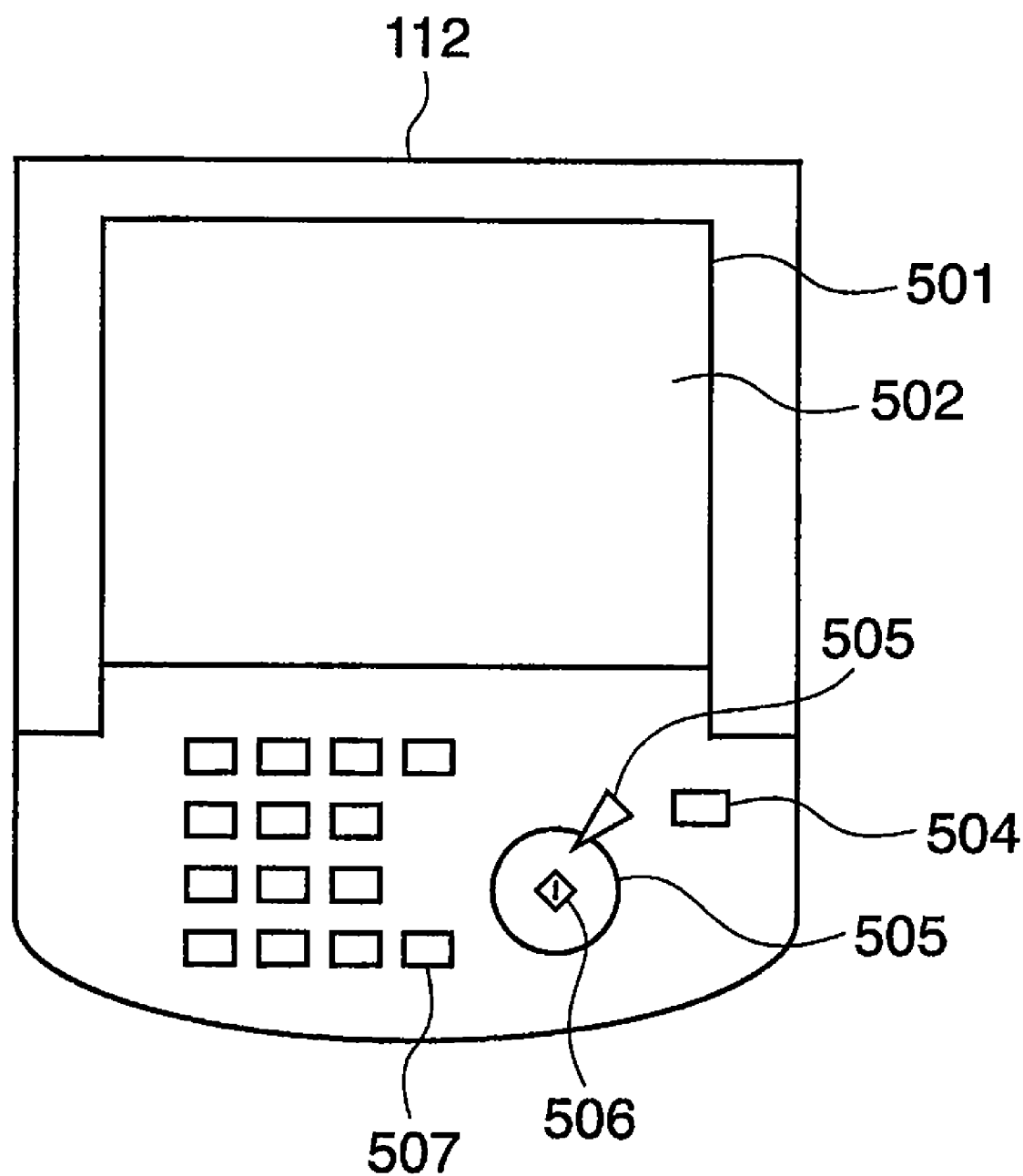
FIG. 5 is a plan view showing a configuration of a console of the image processing apparatus.

FIG. 5 is a plan view showing a configuration of the console 112 of the image processing apparatus 110. An LCD display unit 501 consists of a touch panel sheet 502 pasted on an LCD (Liquid Crystal Display). The display unit 501 displays an operation screen of the image processing apparatus 110 and soft keys. When a displayed key is pressed, it transmits position information which represents the pressed position to the CPU 301 of the controller unit 111.

A start key 505 is used to start reading original images. There is a green/red two-color LED indicator 506 in the center of the start key 505. It indicates by color whether the start key 505 is ready for operation. A stop key 503 is used to stop the image processing apparatus 110 from operating. An ID key 507 is used to enter a user ID of the user. A reset key 504 is used to initialize settings on the console 112.

Figure 6:
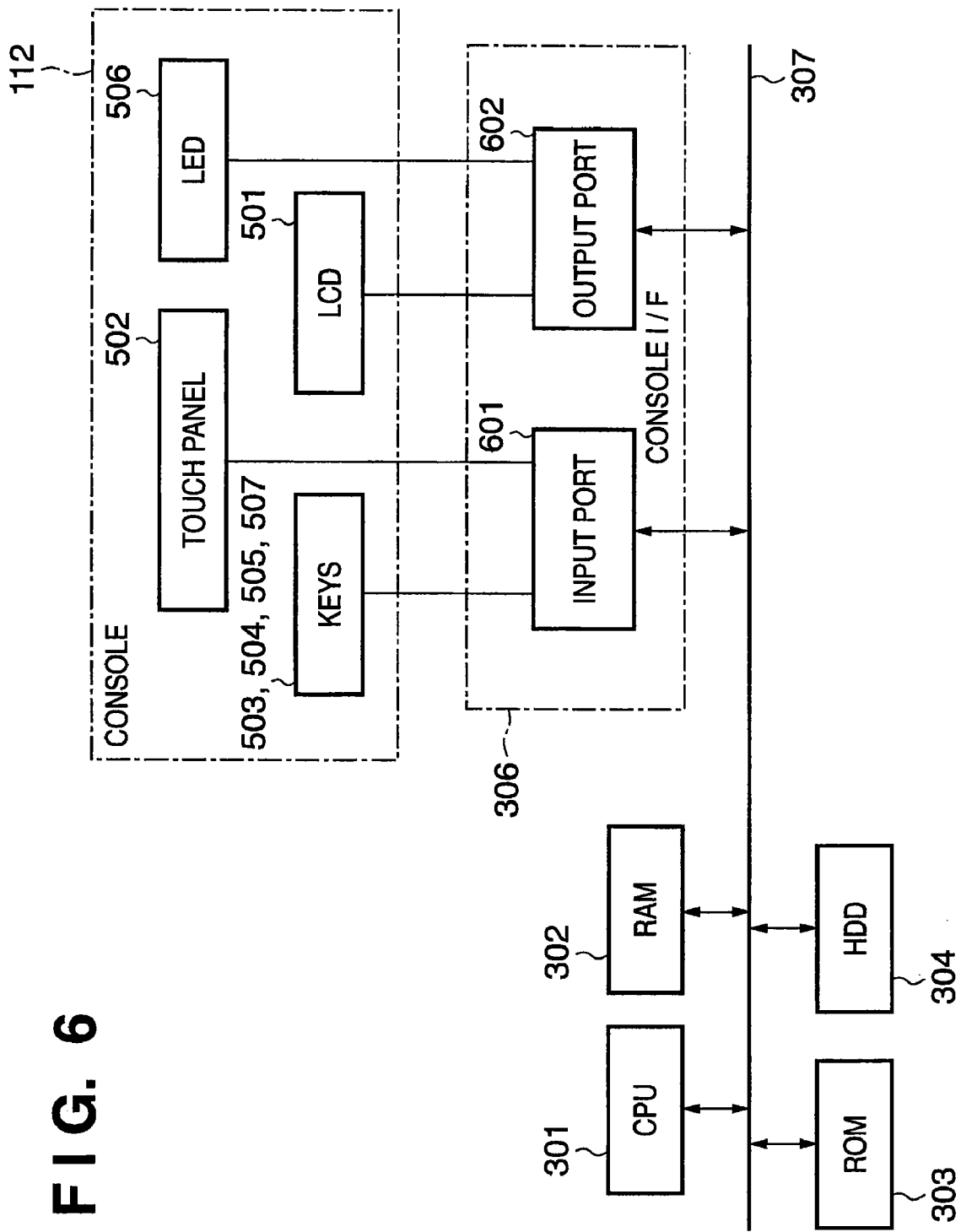
FIG. 6 is a block diagram showing an internal configuration of the console and console I/F of the image processing apparatus in comparison with an internal configuration of a controller unit.

FIG. 6 is a block diagram showing an internal configuration of the console 112 and console I/F 306 of the image processing apparatus 110 in comparison with an internal configuration of the controller unit 111. As described above, the console 112 is connected to the system bus 307 via the console I/F 306. The system bus 307 is connected with the CPU 301, RAM 302, ROM 303, and HDD 304. The CPU 301 generally controls access to and from the devices connected to the system bus 307 based on a control program and the like stored in the ROM 303 and HDD 304. Also, the CPU 301 reads input information from the scanner 113 connected via the device I/F 312 and outputs an image signal as output information to the printer 114 connected via the device I/F 312. The RAM 302 functions as a main memory, work area, and the like of the CPU 301.

Information entered by the user from the touch panel 502 and various hard keys 503, 504, 505, and 507 is passed to the CPU 301 via an input port 601. The CPU 301 generates screen display data based on content of the user-entered information and on the control program and outputs it to the LCD display unit 501 via an output port 602 which controls screen output devices. Also, it controls the two-color LED indicator 506 as required.

Figure 7:
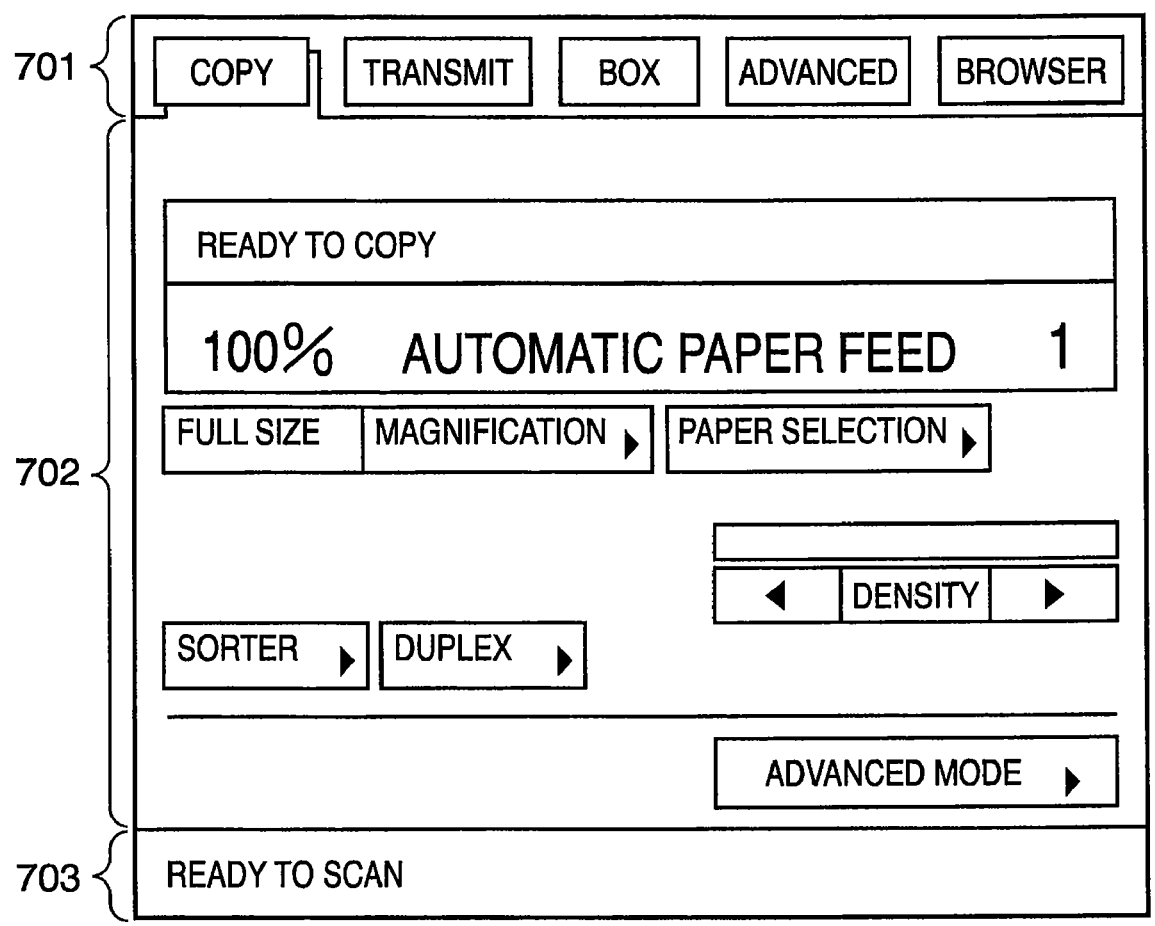
FIG. 7 is a diagram showing an example of a standard operation screen displayed on the console of the image processing apparatus.

FIG. 7 is a diagram showing an example of a standard operation screen displayed on the console 112 of the image processing apparatus 110. The button group arranged in a top section 701 of FIG. 7 is used to select one of various functions provided by the image processing apparatus 110.

The Copy function is used to obtain a copy of an original by reading original image data with the scanner 113 and printing it on the printer 114. The Transmission function is used to transmit original image data read by the scanner 113 or image data accumulated in the HDD 304 to various output destinations. The output destinations include output destinations to which the data can be transmitted via the network I/F 308 using any of various protocols and output destinations to which the data can be transmitted via the modem 309 using facsimile or other protocol. The data can be transmitted to multiple output destinations selected from those described above.

The Box function is used to view, edit, print, or transmit document files of image data or code data accumulated in the HDD 304. The document files accumulated in the HDD 304 include original image data read by the scanner 113. Besides, they include data downloaded via the network I/F 308, print data received from other apparatuses via the network I/F 308 and accumulated, and facsimile data received from other apparatus via the modem 309. The Box function can be used as an electronic mail box in office environment of the user. Also, it can be used for secured printing which increases the secrecy of a PDL print job by delaying paper printout until a password is entered. The Advanced function is used to call various advanced functions including a function to exclusively lock the scanner 113 for use by external apparatus. The Browser function is used to browse Web sites.

A midsection 702 of FIG. 7 shows an operation screen brought up when the copy function is selected. A bottom section 703 of FIG. 7 is a status display area, which displays various messages including various functions of the image processing apparatus 110 and information about the apparatus itself to the user regardless of the function selected in the top section 701 of FIG. 7.

<Description of Remote UI>

Next, description will be given of a remote UI (remote user interface), one of the functions which operate on the Web-Server module 203. The remote UI is a function used to acquire and configure various information about the image processing apparatus (apparatus information, function information, status information, retained information, and the like) or make the image processing apparatus perform a print, Universal-Send, or other operation from a Web browser external to the image processing apparatus.

The Web-Server module 203 of the image processing apparatus 110 is connected to the network via the HTTP module 212 and TCP/IP module 216 and conducts HTTP communications with Web browsers. The user can use the remote UI function by accessing the image processing apparatus 110 using the Web browser 1021 from, for example, the desktop computer 102 connected to the network.

The HDD 304 of the image processing apparatus shown in FIG. 3 stores a resource file group containing files for use to display various Web pages (described later) and template file group containing templates for various pages. The resource files include HTML files and image files for use to display various pages on clients. The template files are referred to by a CGI program and used to create various pages to be displayed on the clients.

To access this image processing apparatus, the user (desktop computer 102) either enters the URL (Uniform Resource Locator) of the image processing apparatus directly in the Web browser on the computer or selects a link in which the URL is embedded. The Web browser sends an HTTP command specifying the URL entered by the user to the image processing apparatus via the network. The Web server of the image processing apparatus receives and analyzes the HTTP command. The Web browser operates according to results of the analysis. If the request from the browser is not for a CGI program, the Web server transmits a specified recourse file out of the resource file group to the browser and finishes processing. On the other hand, if the request from the browser is for a CGI program, the Web server starts up the appropriate CGI program.

The CGI program receives a query parameter (query: processing request) on startup. Consequently, a value specified by the user on the browser is passed to the CGI program. The CGI program requests the controller unit 111 to acquire and configure various information, or print out the information based on a user request. The various information includes apparatus information concerning paper sizes available on the image processing apparatus and a remaining paper quantity as well as function information concerning scan, copy, and other functions which can be executed on the image processing apparatus. Besides this, it includes status information concerning, for example, whether the image processing apparatus is waiting or in operation as well as information retained by the image processing apparatus.

Also, the CGI program creates pages to be transmitted to the browser using template files which correspond to various pages to be displayed on the client. The template files contain sections in which description is changed based on the acquired apparatus information, making it possible to create page content according to the current status.

The browser formats the pages received from the image processing apparatus and presents them on the display unit for the user. This allows the user to access the image processing apparatus using the browser, acquire and configure various information on the image processing apparatus externally, and thereby operate the image processing apparatus.

The information which can be acquired and configured using the remote UI includes job information, document information, address information, and network setting information in addition to the apparatus information, function information, and status information described above. The apparatus information includes, for example, information concerning paper sizes available on the image processing apparatus and a remaining paper quantity. The function information includes, for example, information concerning scan, copy, and other functions which can be executed on the image processing apparatus. The status information includes, for example, information concerning whether the image processing apparatus is in wait or in operation. The job information includes, for example, information concerning the processing date/time of jobs input in the image processing apparatus and number of copies. The document information concerns, for example, documents stored in a storage (HDD) of the image processing apparatus. The address information concerns addresses used for communications such as e-mail and facsimile. The operations which can be performed by the remote UI include printout and transmission of the document information held in the image processing apparatus.

Figure 8:
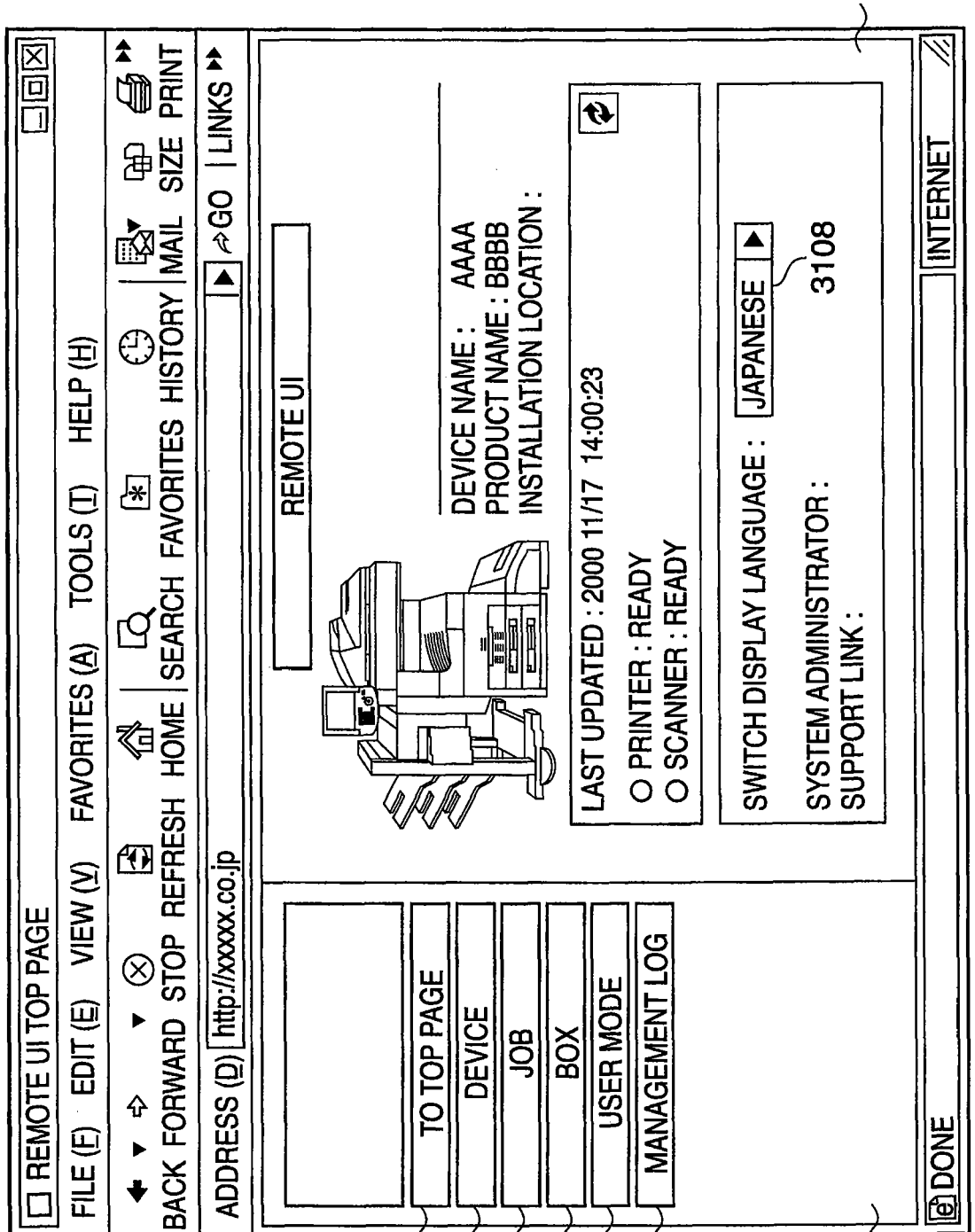
FIG. 8 is a diagram showing an example of a screen displayed on a Web browser when accessing a remote UI function provided by the image processing apparatus.
Figure 16A:
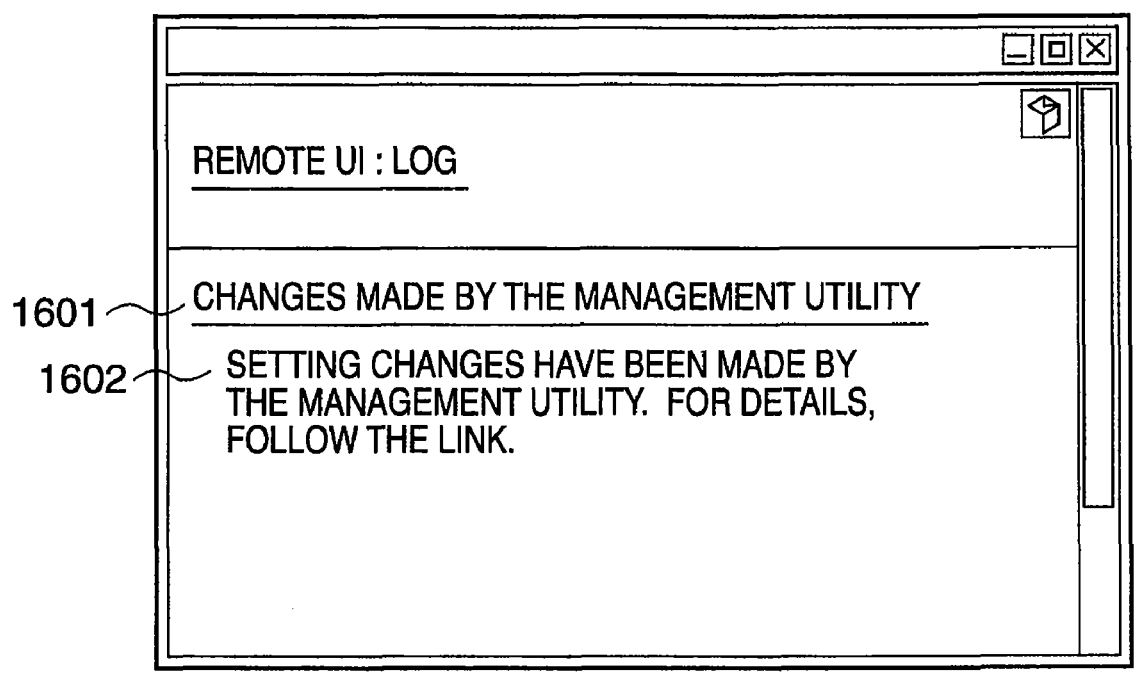
FIGS. 16A and 16B are diagrams showing pages containing a link generated based on a link request.
Figure 16B:
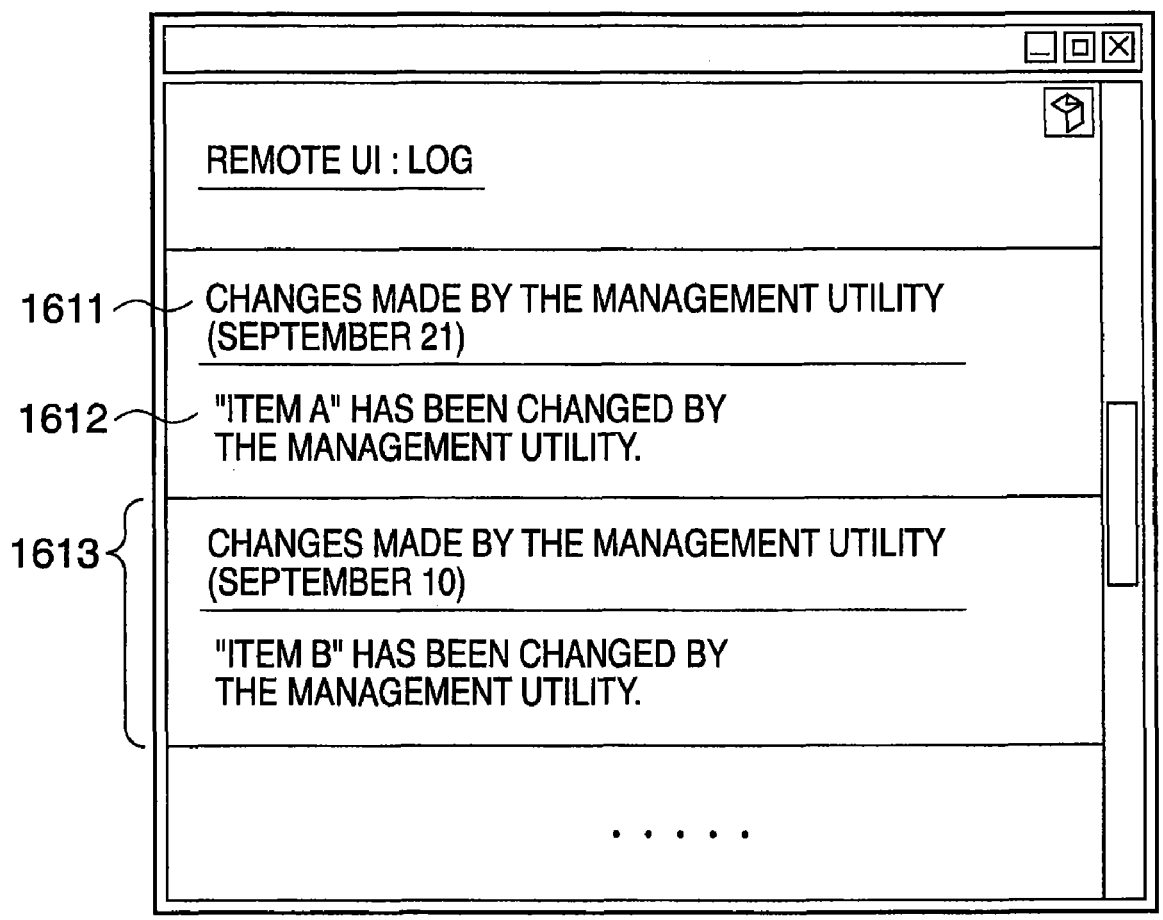

FIG. 8 shows a top page of the remote UI. It is a default page displayed on a Web browser when connected to the image processing apparatus by specifying its IP address as the URL. The screen consists of two frames: an index area 3101 and main area 3102. The index area displays a major site map. When a button on the map is pressed, a corresponding screen is displayed in the main area. The top page displays general information about the device. Besides this, buttons arranged in the index area, when pressed, bring up a device information page, job status page, box page, user mode page, and the like, respectively. The buttons in the index area include a Device button 3104, Job Status button 3105, Box button 3106, User Mode button 3107, and Management Log button 3109. When the Management Log button 3109 is pressed, a log page such as that shown in FIGS. 16A and 16B is displayed in the main area 3102. When the To Top Page button is pressed, the top page is displayed. A Change Display Language pull-down menu 3108 is used to select a display language. When pressed, it displays a pull-down menu of available display languages. When the user selects a language from the pull-down menu, a top page in the selected language appears.

The device information page, job status page, box page, and user mode page are used to display details of devices or various information; display job status and history; view, edit, print, or transmit documents accumulated in the devices; and make various device settings, respectively. The user can perform various operations on these pages. The log page displays history information about changes in device settings. It includes a summary of each setting change and a link to log information managed by the management utility.

<Description of Management Apparatus>

Next, the management apparatus 101 will be described. The management apparatus 101 is a typical computer consisting of input devices, output devices, a CPU, a storage, and the like. Its hardware configuration is known, and thus a description thereof will be omitted.

As shown in FIG. 1, the management apparatus 101 is connected with devices it manages including the image processing apparatus 110 and 120 via the network. The management apparatus 101 conducts communications using SNMP (Simple Network Management Protocol). It collects information about status of the devices it manages at predetermined intervals. The status of the devices includes, for example, Standby, Printing, and Error as well as status of consumables such as paper and toner. Besides this, settings of the image processing apparatus can be changed from the management apparatus. Furthermore, applications which run on the image processing apparatus 110 can be added or deleted from the management apparatus.

Also, the management apparatus functions as a Web server. Upon receiving an HTTP request from a Web browser running on the desktop computer 102 or the like, the management apparatus analyzes the request, reads Web page data out of the storage, and transmits a response. Upon receiving the response, the Web browser formats the received data and presents it on the display unit for the user. In this way, the user can access the management apparatus using a Web browser running on the desktop computer 102, and thereby acquire and configure various information about the devices managed by the management apparatus. In response to the request from the Web browser, the management apparatus 101 acquires information about an apparatus under its management (managed apparatus), embeds the acquired information in a template written in a mark-up language such as HTML, and gives a response displayable on the browser using the Web server function. Examples include the screens in FIGS. 9 and 10. The acquisition of information from the managed apparatus can be implemented using SNMP. Items of information which lend themselves to setting changes are managed by a MIB. Also, data manipulation and the like performed in response to a request from a Web browser can be implemented using a CGI such as described above.

Figure 9:
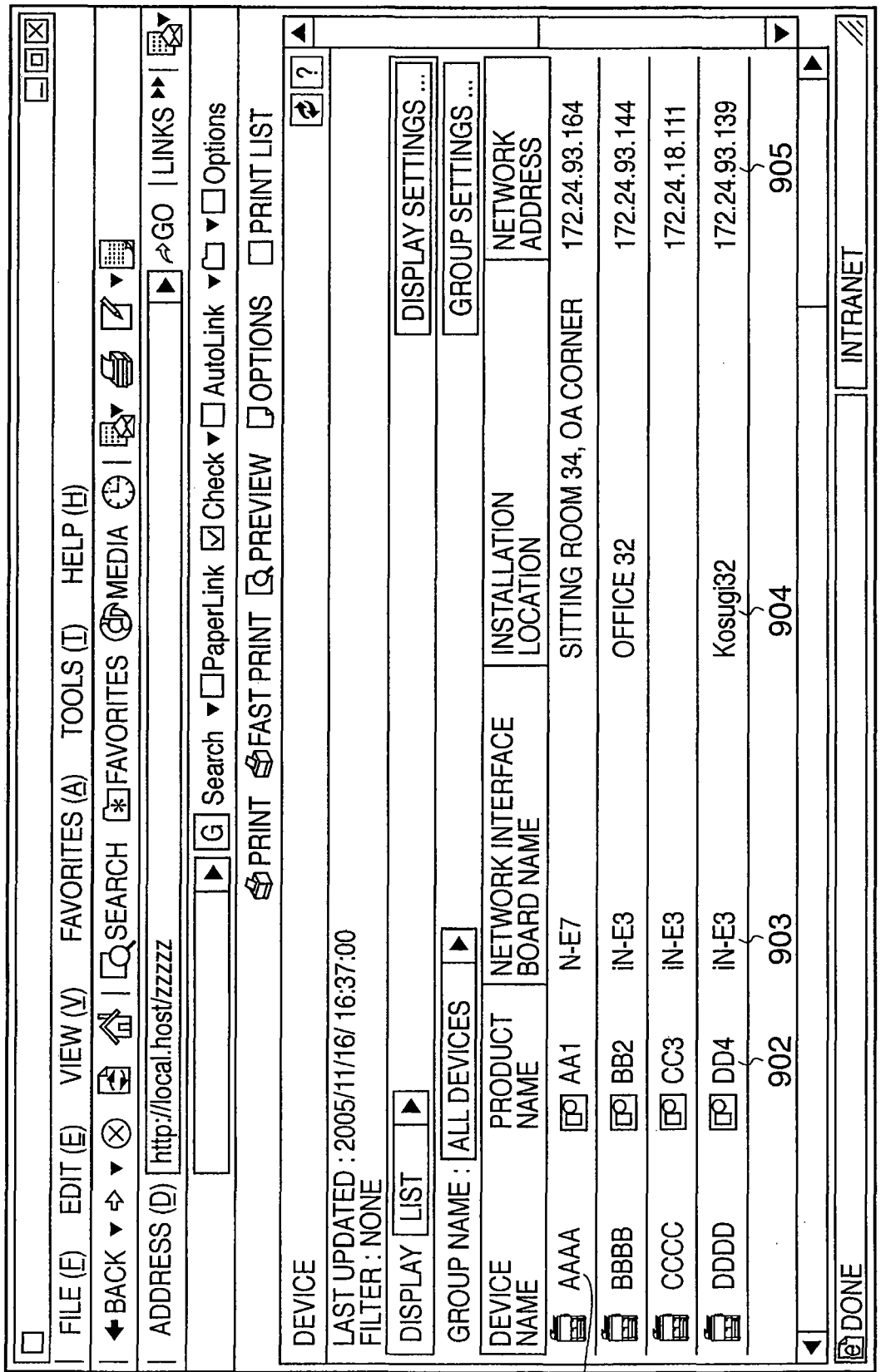
FIG. 9 is a diagram showing an example of a top screen displayed on the Web browser when accessing a Web server function of a management apparatus.

FIG. 9 shows a page displayed on the Web browser 1021 running on the desktop computer 102 when connected to the management apparatus 101 by specifying its IP address. The devices managed by the management apparatus 101 are listed. They are set to be managed. They include the image processing apparatus 110 and 120. A device name 901, product name 902, network interface board name 903, installation location 904, and network address 905 are displayed for each managed apparatus. The device name 901 is presented as link text. When the user select a link, an information screen of the selected device appears.

Figure 10:
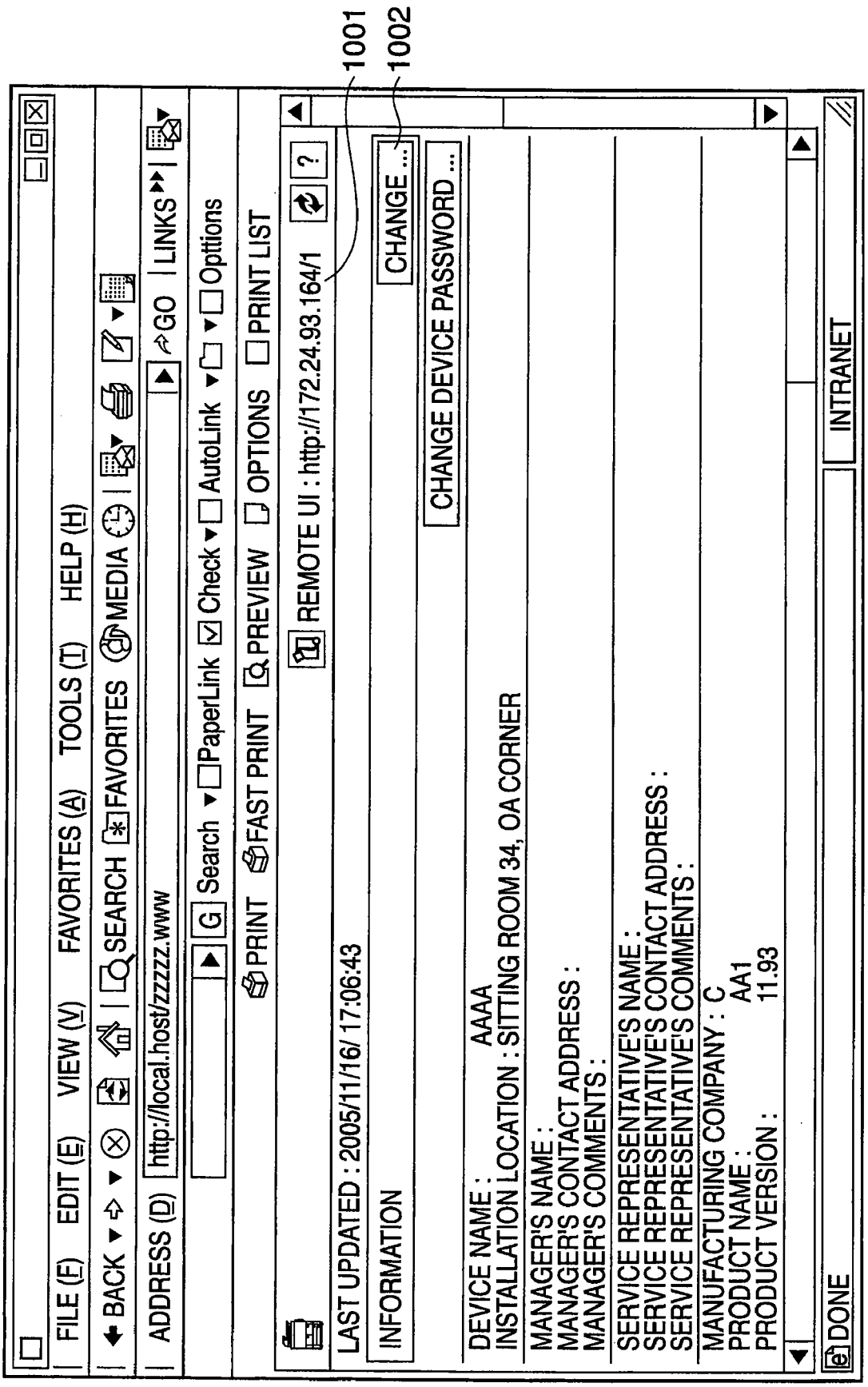
FIG. 10 is a diagram showing an example of a device information screen provided by the Web server function of the management apparatus.

FIG. 10 shows a device information screen brought up when link text under the device name 901 is selected. As device-related information, this screen displays the device's name, installation location, manager information (name, contact address, and comments), service-representative information (name, contact address, and comments), manufacturer name, product name, product version, and the like. In this example, the displayed information is used for management, for example, by the manager of the device and is referred to as device management information.

The device management information may be saved in the management apparatus 101 as HTML data associated with the device. Alternatively, the management apparatus 101 may generate HTML data and transmit it to a browser based on the device management information associated with the device each time it is requested by the browser. According to this embodiment, it is assumed that the device management information is saved like the latter manner.

FIG. 10 shows device management information which can be changed via the management apparatus 101. Of course information other than the information illustrated here may be included in the device information. In this example, the device management information includes information needed for management of the device, but does not include information about operation settings such as print settings and scan settings. Also, in FIG. 10, a link 1001 provides a link to the IP address of the selected device. When the user clicks the link 1001, the Web browser makes an HTTP request to the device (e.g., the image processing apparatus 110) represented by the link information, and consequently, the remote UI page (FIG. 9) of the device is displayed on the browser. When the user presses a Change button 1002, a change screen for setting changes appears.

Figure 11:
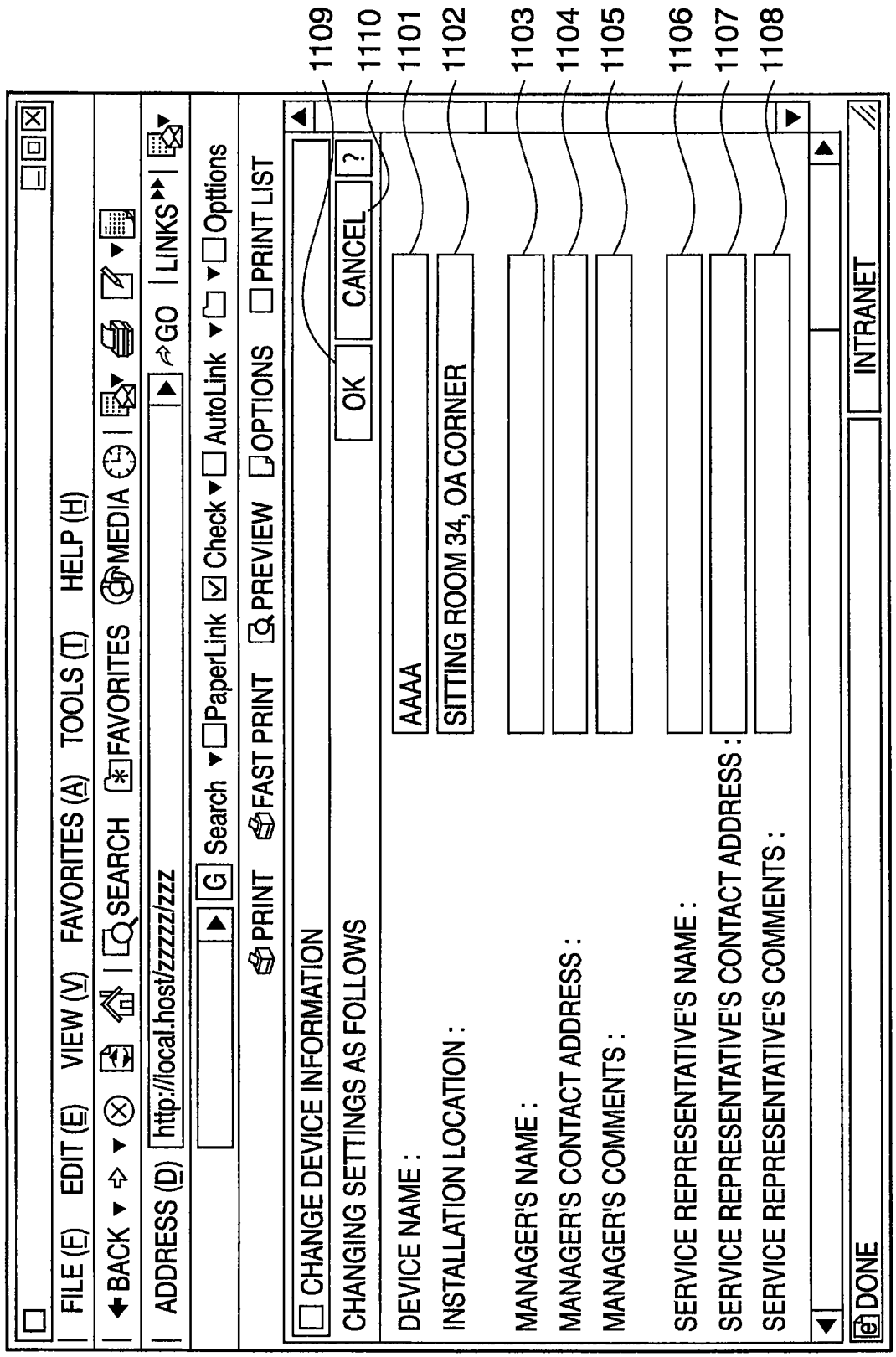
FIG. 11 is a diagram showing an example of a device information change screen provided by the Web server function of the management apparatus.

FIG. 11 shows an example of a change screen. Fields 1101 to 1108 are text input fields. They allow the user to enter a device name, an installation location, manager information, and other information. The manufacturing company, product name, and product version are determined by the manufacturer, and they cannot be changed in this example. When the user presses an OK button 1109, the Web browser 1021 transmits an HTTP request to the management apparatus 101, requesting the latter to set the values entered in the text input fields 1101 to 1108 for the device. When the management apparatus 101 receives the request, the management utility 1012 analyzes the request and changes settings of the appropriate device. To make the setting changes, SNMP commands or commands based on a special protocol are transmitted from management apparatuses to the device. Pressing a Cancel button 110 returns to the screen shown in FIG. 9.

Incidentally, pages used to view and configure device information have been taken as an example, but other pages are also provided, including pages used to view status and history information of jobs running on other devices, pages used to display management logs, and pages used to add applications to other devices.

<Operation of Management Apparatus>

Figure 12:
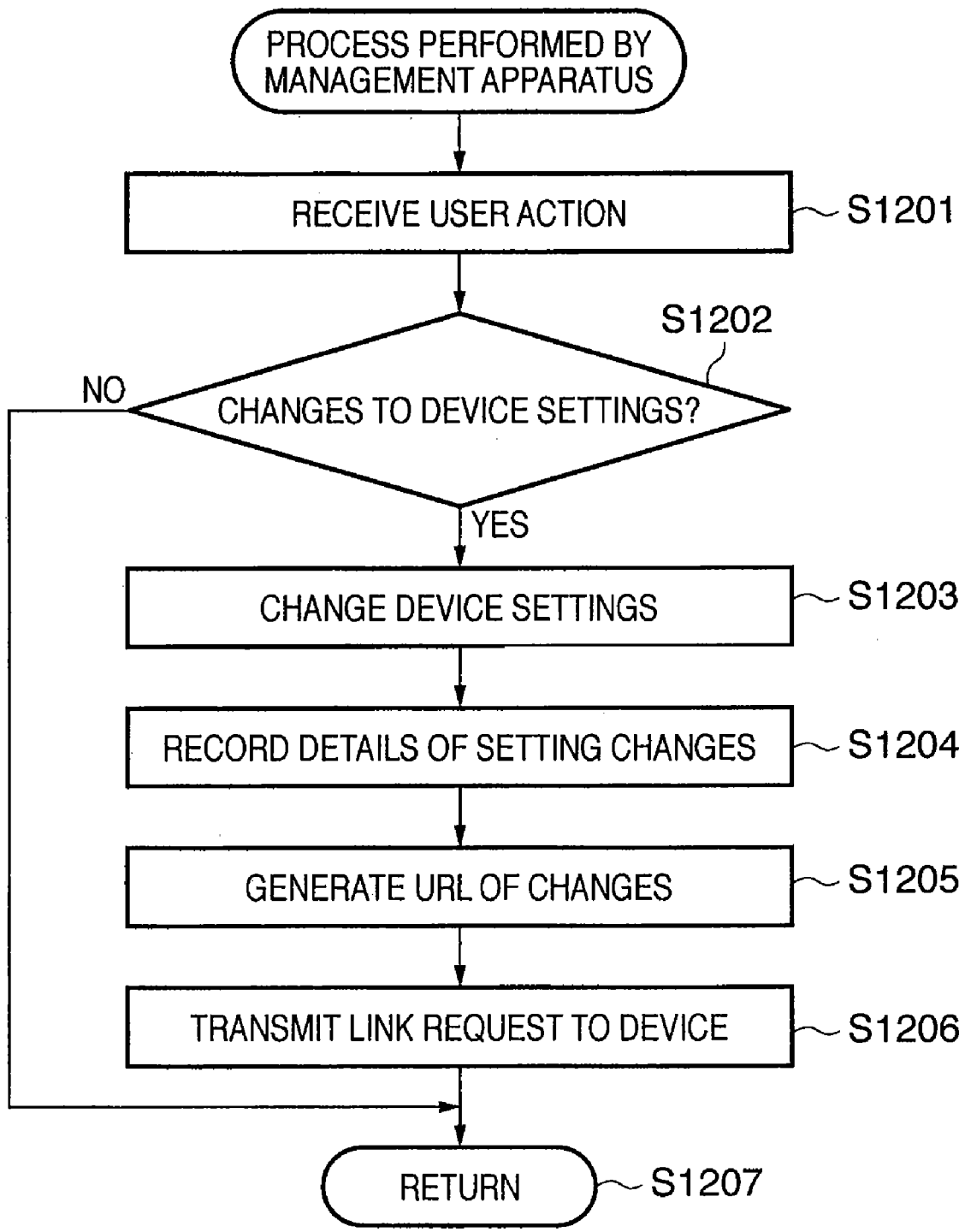
FIG. 12 is a flowchart showing procedures carried out by the management apparatus upon receiving an operation request from a user.

Next, operation performed by the management apparatus when the Web server of the management apparatus receives an operation request from a user will be described in detail with reference to FIG. 12. This process is performed by the management utility 1012 upon receiving the processing request via the Web server 1011. FIG. 12 shows procedures for processing a request to change device management information when the change request is received after acquiring the device management information from a device.

In Step S1201, the management apparatus receives a request from a user (Web browser). In Step S1202, the management apparatus determines whether the user action is a request to change settings of a device. A request to change settings of a device is transmitted when the OK button 1109 in FIG. 11 is pressed. If it is not a request to change settings of a device, the management apparatus goes to Step S1207 to finish processing.

If it is a request to change settings of a device, the management apparatus goes to Step S1203 to change the settings of the device. To change the settings of the device, the management apparatus transmits the set values received from the Web browser to the device in the form of SNMP commands or commands based on a special protocol. In Step S1204, the management apparatus generates an HTML file of the changed settings and stores it in the storage unit of the management apparatus. The generated HTML file contains log information which represents a change history of the device management information. The management apparatus automatically generates the HTML file describing the changes by embedding the date/time of change, user who has made the changes, details of the changes, and other information in a template file prestored in the management apparatus. Contents of the HTML file correspond to the browser display illustrated in FIG. 10. The HTML file is the object linked with the link information associated with the device name in the device list illustrated in FIG. 9. Alternatively, a page may be displayed to allow the user to enter details of changes to device settings when the user makes a change request.

Figure 13:
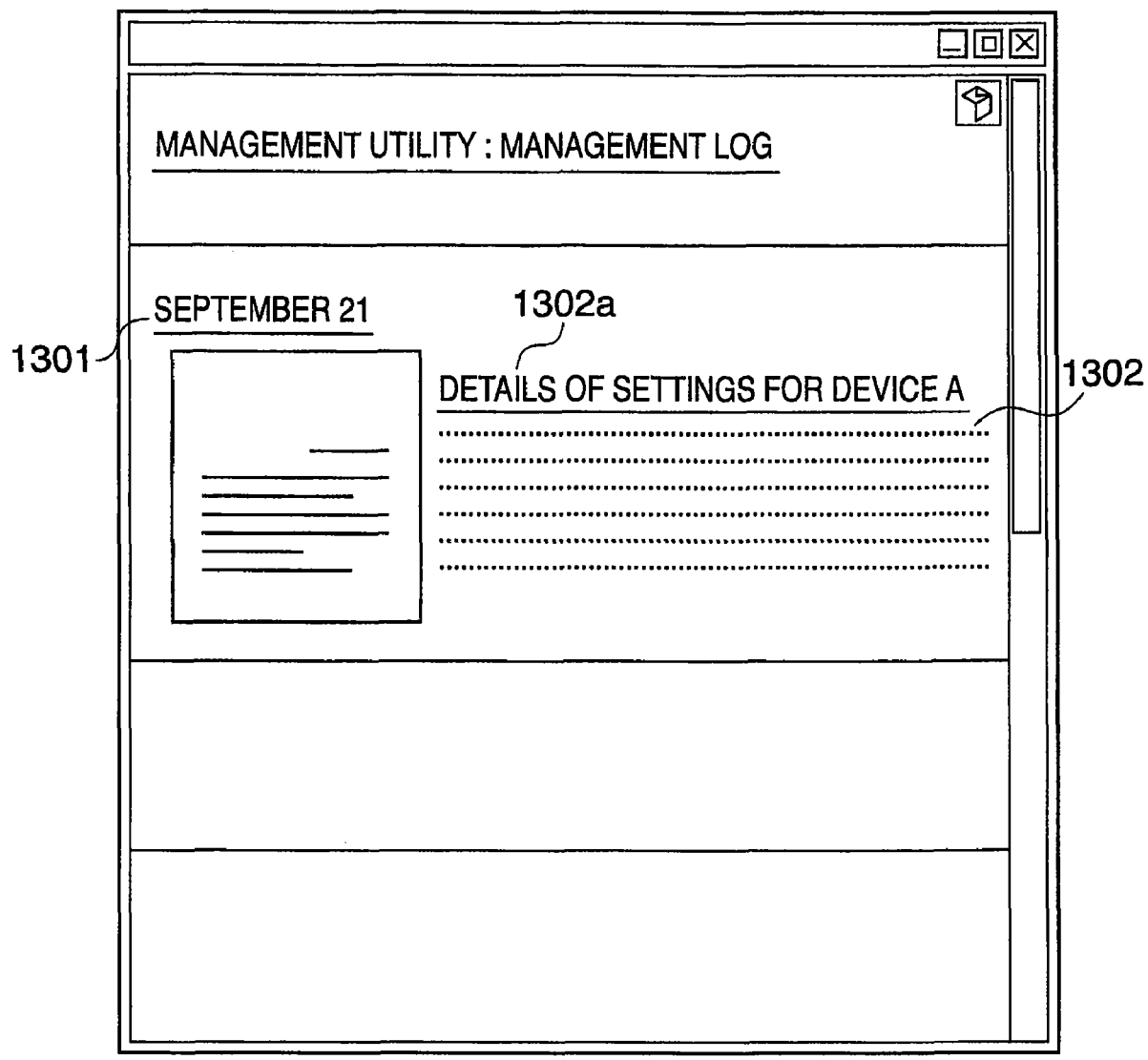
FIG. 13 is a diagram showing an example of a browser screen displaying an HTML file containing details of changes generated by the management apparatus.

FIG. 13 shows an example of a browser screen displaying an HTML file generated in Step S1204. It contains an update date 1301 and detailed description 1302 of changes to the managed device (device A). Incidentally, in the example of FIG. 13, a link 1302a to the device A is included in the title of the description 1302.

In Step S1205, the management apparatus generates a URL to provide the stored HTML file to the outside using its Web server function. The URL is generated, for example, based on the domain name of the Web server containing the HTML file, folder containing the HTML file, and name of the HTML file. In Step S1206, the management apparatus transmits a link request to the device. In response to the link request, the managed device describes text and other information described in the link request and a link to log information provided by the management apparatus 101 in the HTML file provided by the Web server 203. The log information is the HTML file generated in Step S1204. Details of the link request will be described later.

Now, the process in Step S1204 will be described. In Step S1204, the management apparatus edits the changed settings, i.e., the changed device management information, in HTML format. For that, the management apparatus describes, for example, the item name (installation location or the like) of each item of the device management information by associating it with the value of the item. The association is established by arranging the item name and item value in the same row. That is, the item names in FIG. 10 and their values may be copied for use as the log information. Besides this, desirably the operator ID, time, ID and address of the client terminal, and the like are included in the log information.

In Step S1206, the management apparatus transmits summary information for the device and the URL created in Step S1205 to the device. The summary information may be a copy of the log information. Also, it may be a message stating that settings of the device management information have been changed. Also, the date/time of change may be included in the summary information. Also, for example, the names of changed items may be listed. Also, the ID of the operator who has made the changes may be included in the summary information. The information described above is written into summary information, being converted into text.

<Details of Link Request>

Next, details of the link request will be described. The link request has the same format as track backs in Web logs (or blogs) which have found wide use recently. The link request is made by transmitting an HTTP POST request such as shown in FIG. 14 to the device. A URL 1401 is used by the device to receive a link request. The management apparatus 101 acquires the URL from the device requested to be linked, using a protocol such as SNMP. A data type 1402 specifies a data type, which is always set to "application/x-www-from-urlencoded". A title 1403 is the title of a link generated on the device side. In FIG. 14, the title is "Changes Made by the Management Utility. A URL 1404 is the one generated in Step S1205, and provides link information to the log information generated in Step S1204. Summary information 1405 summarizes the linked Web page. The character string 1403 and character string 1405 may be specified in advance in the management apparatus. Alternatively, input from the user may be accepted during setting change operations. Also, as described in Step S1206, the character string 1405 may be generated automatically by documenting setting information, operation information, and operator information in advance.

<Details of Reception of Link Request by Device>

Figure 15:
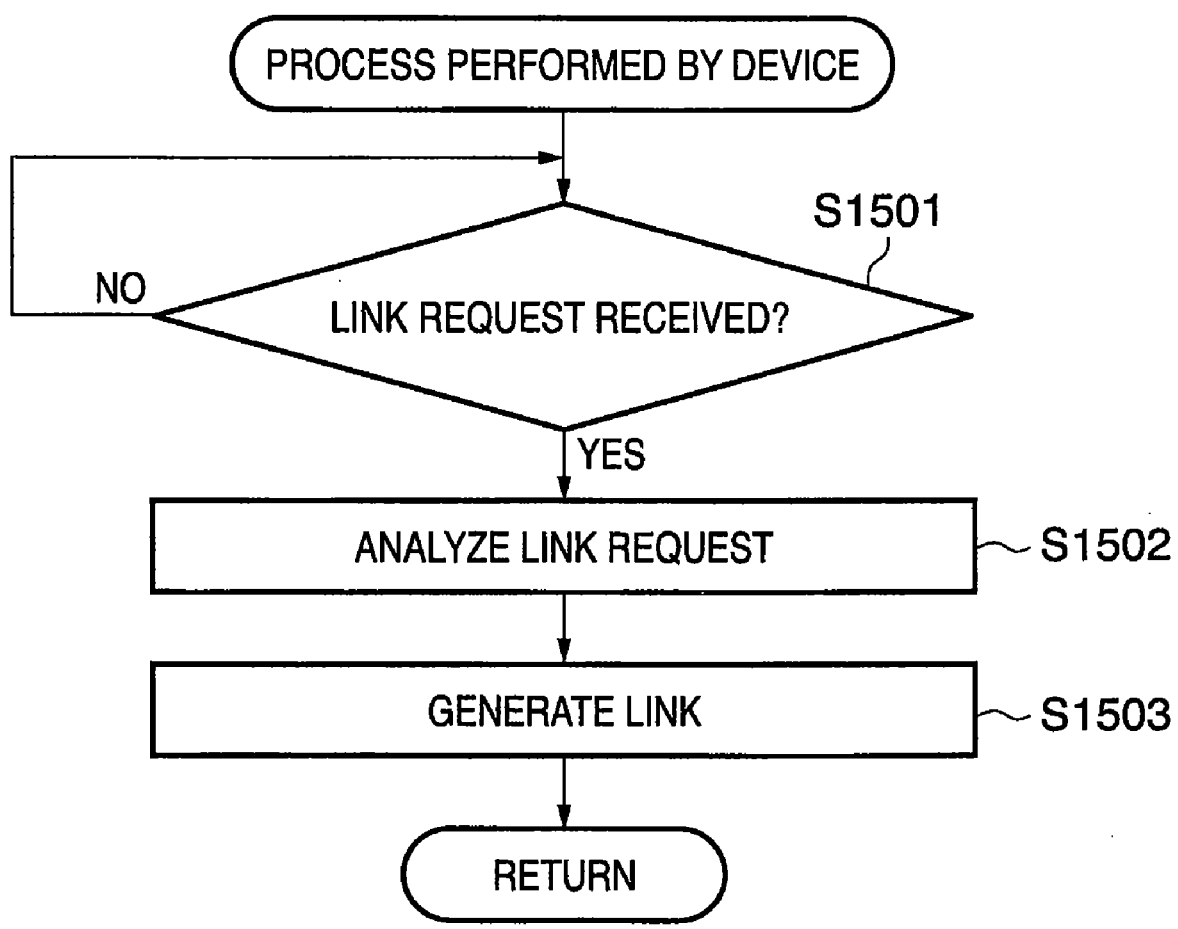
FIG. 15 is flowchart showing procedures carried out by the image processing apparatus upon receiving a link request.

Next, processes performed by a device upon receiving a link request from the management apparatus 101 will be described with reference to the flowchart in FIG. 15. In Step S1501, the device waits for a link request. Determination as to whether a received HTTP request is a link request is based on whether its URL is designed for reception of a link request. Upon receiving a link request, the device goes to Step S1502 to analyze the link request. Since the link request is an HTTP POST request in a format such as shown in FIG. 14, the device analyzes the URL 1404 of the linked object, the title 1403 of the link, and summary information 1405 about the link. In Step S1503, the device generates a link based on the analyzed request. The link is generated by writing into a resource file stored in the HDD 304 of the image processing apparatus. For example, when the link request shown in FIG. 14 is received, the device generates a link by writing the following lines.

<a href="http://management_server.example.com/pageid1">

Changes Made by the Management Utility

</a> Setting changes have been made by the management utility. For details, follow the link.

That is, the URL 1404 attached to the link request is added to the <a href=> tag and associated with the title character string as its link information. Then the character string of the summary is added following the title character string.

The link request reception process described above is performed by the Web-Server module 203 embedded with the log manager. If a Web server has a Web log function, it can implement the process in FIG. 15 by itself. According to this embodiment, the log manager 250 and Web server 203 are separate modules as shown in FIG. 2. FIG. 16A shows an example of a page which displays a management log of a remote UI of a device. It contains a link generated in response to a link request. A link 1601 is a character string containing a link generated based on a link request received from the management apparatus. The link character string 1601 is based on the title character string 1403 contained in the link request. It provides a link to the URL 1404 contained in the link request. When it is selected by the user, the browser displays an appropriate Web page (FIG. 13) of the management apparatus. A character string 1602 is based on summary character string 1405 contained in the link request.

FIG. 16B shows another example. This example further contains a title character string consisting of a hyper-linked title line 1611 as well as an update date. The update date is data received as part of the title character string of the link request. A summary character string field 1612 contains names of changed items in addition to a fixed character string. Furthermore, in FIG. 16B, device log information added in response to a link request is accumulated and displayed in time sequence. Consequently, past device log information 1613 is displayed as well. For example, a vertical scroll bar allows the user to view the part of the device log information which is lying outside a window.

The processes described above makes it easier for the user to view information recorded in the management apparatus because a link to the information is generated automatically on a Web page of a remote UI provided by an image processing apparatus under management.

Second Embodiment

Next, description will be given of an embodiment which adds applications dynamically to an image processing apparatus. As described above, the JAVA (registered trademark) VM 230 of the image processing apparatus receives, manages, and executes additional application files. The additional applications are written in the JAVA (registered trademark) language. They can perform various processes by operating a scanner and printer of the image processing apparatus using various types of class library. The additional applications are installed and uninstalled at the request of the management apparatus 101. Incidentally, in this embodiment, description of hardware and software configurations, which are the same as the first embodiment, will be omitted.

Figure 17:
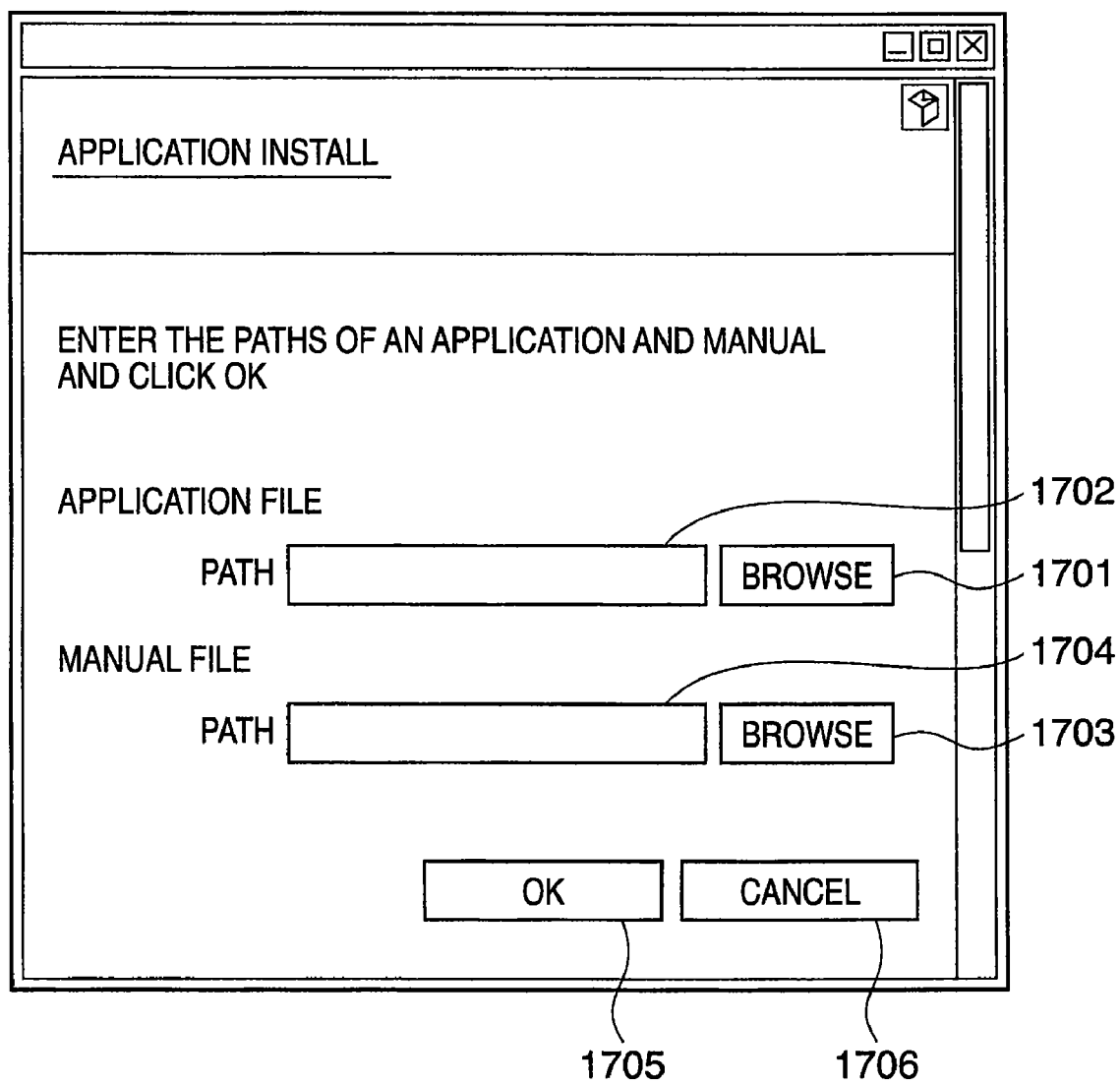
FIG. 17 is a diagram showing an example of a screen displayed by the management apparatus to add an application to the image processing apparatus from the management apparatus.

FIG. 17 shows a screen displayed by the management apparatus 101 to install an application on the image processing apparatus 102 from the management apparatus 101. An application selection button 1701 is used to select an application file to be installed. When this button is pressed, an OS-standard file selection dialog box appears. The user can select an application to install, from the dialog box. An application file path field 1702 displays the path of the application file selected by the user.

A manual file selection button 1703 is used to select an application's manual file to be installed. When this button is pressed, an OS-standard manual file selection dialog box appears. The user can select a manual file to install, from the dialog box. A manual file path field 1704 displays the path of the manual file selected by the user.

An OK button 1705 is used to install the application file and manual file selected by the user. A Cancel button 1706 is used to cancel the installation.

Figure 18:
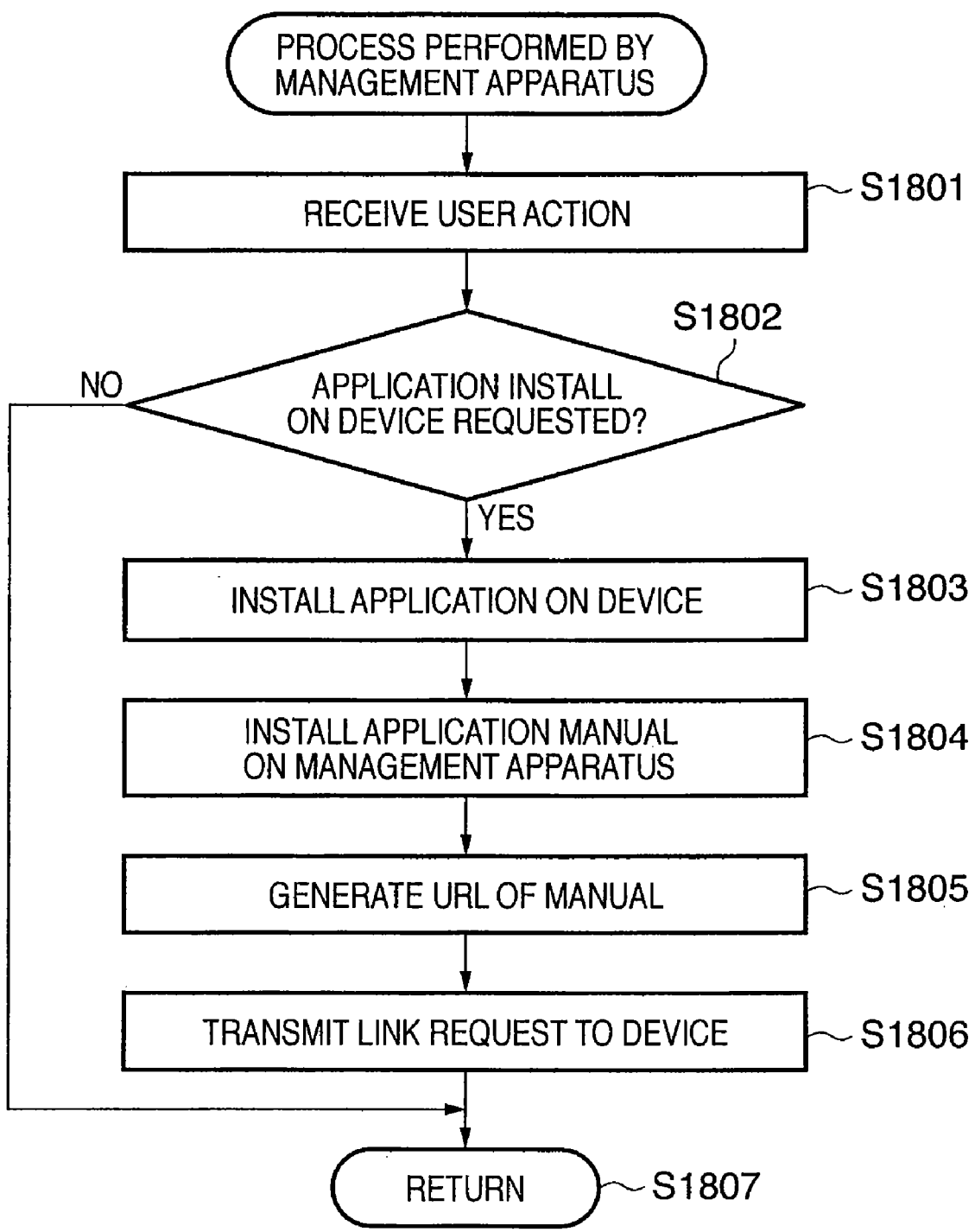
FIG. 18 is flowchart showing procedures carried out by the image processing apparatus upon receiving an application install request.

Next, operation performed by the management apparatus 101 upon receiving a request to install an application on a device (image processing apparatus) from a user will be described in detail with reference to the flowchart in FIG. 18. In Step S1801, the management apparatus 101 receives a request from the user. In Step S1802, the management apparatus determines whether the user action is a request to install an application on a device (the OK button 1705 is pressed). If it is not a request to install an application on a device, the management apparatus goes to Step S1807 to finish processing. If it is a request to install an application on a device, the management apparatus goes to Step S1803 to transmit the application file selected in the field 1702 to the device. The device receives and installs the application file. That is, the JAVA (registered trademark) VM 230 of the image processing apparatus receives, manages, and executes the application file. In Step S1804, the management apparatus 101 stores the manual file in its storage unit. That is, the manual file is stored in the storage unit of the management apparatus 101 rather than being installed on the image processing apparatus. In Step S1805, the management apparatus 101 generates a URL which identifies the storage location and file name of the manual file so that the stored manual file can be called using the Web server function. In Step S1806, the management apparatus 101 transmits a link request to the device, describing the generated URL as the URL 1404 of the linked object. The title character string is, for example, the name of the installed application program. A character string "User Manual" may be included in the link information in a fixed manner. Also, for example, version information, installation date/time, and the like of the application, if available, may be acquired and so as to be included in the summary information.

Operation of the device which has received the link request is the same as that shown in FIG. 12. The device automatically generates a link to the manual stored in the management apparatus.

Figure 19:
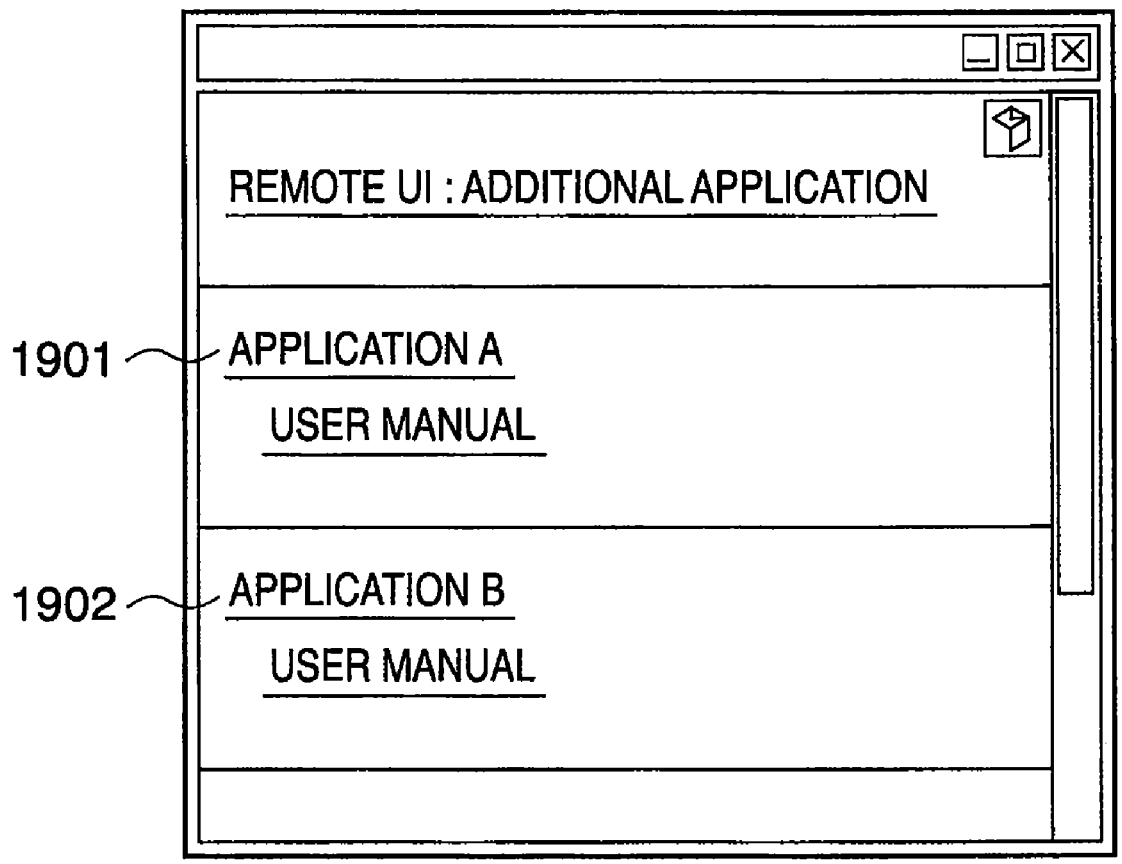
FIG. 19 is a diagram showing a page containing a link generated based on a link request.

FIG. 19 shows an example of an additional-application management page provided by the remote UI of an image processing apparatus. Links 1901 and 1902 are generated based on link requests received from the management apparatus 101. The links are associated with character strings of application names. When the character string of an application name is selected by the user, the file (manual file) represented by link information associated with the character string is referred to. Consequently, the manual file identified by the link information is retrieved from the storage of the management apparatus 101, transmitted to the browser, and displayed on it.

As described above, the manual file is stored in the storage unit of the management apparatus 101. Since a Web application on a device has a link to its manual being stored in the management apparatus 101 generated automatically, it is possible to provide ample information without imposing a storage burden on the managed device.

Conversely, the system may be configured such that an image processing apparatus will transmit a link request to the management apparatus 101 and that the management apparatus 101 will generate a link.

The present invention may be applied either to a system consisting of two or more devices (e.g., a host computer, interface devices, a reader, a printer, and the like) or to an apparatus (e.g., a copying machine, facsimile machine, or the like) consisting of a single device. The object of the present invention can also be achieved by recording medium containing program code that implements the functions of the above embodiments: it is supplied to a system or apparatus, whose computer then reads the program code out of the recording medium and executes it. In that case, the program code itself read out of the recording medium will implement the functions of the above embodiments, and the program code itself and the recording medium which stores the program code will constitute the present invention.

Also, the functions of the above embodiments may be implemented by part or all of the actual processing executed, in accordance with instructions from the program code, by an operating system (OS) running on the computer. Furthermore, the functions of the above embodiments may also be implemented by part or all of the actual processing executed by a CPU or the like contained in a function expansion card inserted into the computer or a function expansion unit connected to the computer if the processing is performed in accordance with instructions from the program code that has been read out of the storage medium and written into memory on the function expansion card or unit.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-061737, filed Mar. 7, 2006, which is hereby incorporated by reference herein in its entirety.

What is claimed is:

1. A device log management system comprising an information processing apparatus, a device management apparatus and a device, wherein the information processing apparatus has: a web browser configured to display a screen image based on image information; and a first transmitter configured to transmit to the device management apparatus a setting of the device changed by a user through the web browser, the device management apparatus has: a generator configure to generate image information in which a change of the setting of the device is written based on the setting of the device changed by the user through the web browser; a storage configured to store the image information generated by the generator; and a second transmitter configured to transmit to the device an address of a location where the image information is stored by said storage, and the device has a web server configured to generate image information containing a link referring to the image information in which the change of the setting of the device is written based on the address transmitted from said second transmitter, wherein said web browser of the image processing apparatus displays a screen image based on the image information containing the link generated by said web server, and wherein said second transmitter further transmits a title of the image information stored by said storage, and summary information of the image information, and said web server of the device generates the image information containing the link generated by the web server, the title of the image information, and the summary of the image information in response to the request for the image information of the log from the user through the web browser.

2. The device log management system according to claim 1, wherein said first transmitter transmits to the device management apparatus an address of a location where a user manual for an application to be installed to the device is stored, the address having been input by the user through the web browser, said second transmitter transmits to the device the address of the location where the user manual transmitted by said first transmitter is stored, the web server of the device generates the image information containing the link referring to the user manual based on the address of the location where the user manual transmitted by said second transmitter is stored, and the web browser of the information processing apparatus displays a screen image based on the image information containing the link referring to the user manual generated by the web server.

3. A device log management apparatus capable of communicating with a device having a web server which generates image information and an information processing apparatus having a web browser which receives the image information and displays a screen image based on the received image information, comprising: a generator configured to generate image information representing settings of the device changed by a user through a screen image for changing the setting of the device, wherein the screen image is provided by the device management apparatus and displayed by the web browser; a storage configured to store the image information generated by said generator; and a transmitter configured to transmit to the device an address of a location where the image information is stored by said storage, wherein the web server of the device generates image information containing a link referring to the image information by which the settings of the device are represented in accordance with the address transmitted by said transmitter, and the web browser of the image processing apparatus displays a screen image containing the link base on the image information generated by the web server, and wherein said transmitter further transmits a title of the image information stored by said storage, and summary information of the image information, and the web server of the device generates the image information containing the link generated by the web server, the title of the image information, and the summary of the image information in response to the request for the image information of the log from the user through the web browser.

4. The device log management apparatus according to claim 3, wherein said transmitter transmits to the device an address of a location where a user manual for an application to be installed to the device is stored, the address having been input by the user through the web browser, the web server of the device generates the image information containing a link referring to the user manual based on the address of the location where the user manual transmitted by said transmitter is stored, and the web browser of the information processing apparatus displays a screen image based on the image information containing the link referring to the user manual generated by the web server.

5. A device log management method performed by a device log management system that comprises an information processing apparatus, a device management apparatus and a device, said method comprising the steps of: a web browser of the information processing apparatus displaying a screen image based on image information; and a first transmitter of the information processing apparatus transmitting to the device management apparatus a setting of the device changed by a user through the web browser, a generator of the device management apparatus generating image information in which a change of the setting of the device is written based on the setting of the device changed by the user through the web browser; a storage the device management apparatus storing the image information generated by the generator; and a second transmitter of the device management apparatus transmitting to the device an address of a location where the image information is stored by said storage, and a web server of the device generating image information containing a link referring to the image information in which the change of the setting of the device is written based on the address transmitted from said second transmitter, wherein a screen image is displayed by the web browser on the image processing apparatus based on the image information containing the link generated by said web server, and further comprising the steps of the second transmitter transmitting a title of the image information stored by said storage, and summary information of the image information, and the web server of the device generating the image information containing the link generated by the web server, the title of the image information, and the summary of the image information in response to the request for the image information of the log from the user through the web browser.

6. The method according to claim 5, further comprising the steps of: the first transmitter transmitting to the device management apparatus an address of a location where a user manual for an application to be installed to the device is stored, the address having been input by the user through the web browser, the second transmitter transmitting to the device the address of the location where the user manual transmitted by said first transmitter is stored, the web server of the device generating the image information containing the link referring to the user manual based on the address of the location where the user manual transmitted by said second transmitter is stored, and the web browser of the information processing apparatus displaying a screen image based on the image information containing the link referring to the user manual generated by the web server.

7. A non-transitory computer readable storage medium in which a program for causing a computer to perform a device log management method capable of communicating with a device having a web server which generates image information and an information processing apparatus having a web browser which receives the image information and displays a screen image based on the received image information, said method comprising the steps of generating image information representing settings of the device changed by a user through a screen image for changing the setting of the device, wherein the screen image is provided by the device management apparatus and displayed by the web browser; storing the image information generated in the generating step; and transmitting to the device an address of a location where the image information is stored in said storing step, wherein the web server of the device generates image information containing a link referring to the image information by which the settings of the device are represented in accordance with the address transmitted by said transmitter, and the web browser of the image processing apparatus displays a screen image containing the link base on the image information generated by the web server, and wherein said method further comprising a step of transmitting a title of the image information stored by said storage, and summary information of the image information, wherein the web server of the device generates the image information containing the link generated by the web server, the title of the image information, and the summary of the image information in response to the request for the image information of the log from the user through the web browser.

8. The computer readable storage medium according to claim 7, wherein said method further comprising a step of transmitting to the device an address of a location where a user manual for an application to be installed to the device is stored, the address having been input by the user through the web browser, wherein the web server of the device generates the image information containing a link referring to the user manual based on the address of the location where the user manual transmitted by said transmitter is stored, and the web browser of the information processing apparatus displays a screen image based on the image information containing the link referring to the user manual generated by the web server.

* * * * *